(12) United States Patent
Wakamatsu et al.

(10) Patent No.: US 7,713,911 B2
(45) Date of Patent: ***May 11, 2010

(54) CATALYST POWDER, EXHAUST GAS PURIFYING CATALYST, AND METHOD OF PRODUCING THE CATALYST POWDER

(75) Inventors: Hironori Wakamatsu, Yokosuka (JP); Masanori Nakamura, Yokosuka (JP); Kazuyuki Shiratori, Yokohama (JP); Hirofumi Yasuda, Yokosuka (JP); Katsuo Suga, Yokohama (JP); Toru Sekiba, Yokohama (JP)

(73) Assignee: Nissan Motor Co., Ltd., Yokohama-shi, Kanagawa-ken (JP)

( * ) Notice: Subject to any disclaimer, the term of this patent is extended or adjusted under 35 U.S.C. 154(b) by 1113 days.

This patent is subject to a terminal disclaimer.

(21) Appl. No.: 11/079,270

(22) Filed: Mar. 15, 2005

(65) Prior Publication Data

US 2005/0215429 A1    Sep. 29, 2005

(30) Foreign Application Priority Data

Mar. 23, 2004    (JP)    ............................. 2004-085350

(51) Int. Cl.
*B01J 21/00*    (2006.01)
*B01J 21/04*    (2006.01)
*B01J 23/00*    (2006.01)
*B01J 23/02*    (2006.01)
*B01J 23/10*    (2006.01)
*B01J 23/40*    (2006.01)
*B01J 23/42*    (2006.01)
*B01J 23/44*    (2006.01)
*B01J 23/56*    (2006.01)
*B01J 23/58*    (2006.01)
*B01J 23/70*    (2006.01)
*B01J 23/72*    (2006.01)
*B01J 20/00*    (2006.01)

(52) U.S. Cl. ................. 502/332; 502/245; 502/252; 502/258; 502/261; 502/262; 502/302; 502/303; 502/304; 502/324; 502/327; 502/328; 502/329; 502/330; 502/331; 502/333; 502/334; 502/339; 502/346; 502/349; 502/350; 502/351; 502/355; 502/415; 502/439

(58) Field of Classification Search ............... 502/302, 502/303, 304, 327, 328, 330, 331, 332, 333, 502/334, 245, 252, 258, 261, 262, 324, 339, 502/346, 349, 350, 351, 355, 415, 439
See application file for complete search history.

(56) References Cited

U.S. PATENT DOCUMENTS 2,980,662 A    4/1961    Jezl
(Continued)

FOREIGN PATENT DOCUMENTS

EP    0 466 984 A1    1/1992
(Continued)

OTHER PUBLICATIONS

Willis, R., "Pumice, Porous Volcanic Rock," Online, XP002364316, URL:http://ceramic-materials.com/cermat/material/2009.html>.
(Continued)

*Primary Examiner*—Cam N Nguyen
(74) *Attorney, Agent, or Firm*—Foley & Lardner LLP

(57) ABSTRACT

A method of producing catalyst powder of the present invention has a step of precipitating a transition metal particle and a base-metal compound in a reversed micelle substantially simultaneously, and a step of precipitating a noble metal particle in the reversed micelle. By this method, it is possible to obtain catalyst powder which restricts an aggregation of noble metal particles even at the high temperature and is excellent in the catalytic activity.

9 Claims, 9 Drawing Sheets

U.S. PATENT DOCUMENTS

| | | | |
|---|---|---|---|
| 3,255,020 A | | 6/1966 | Ferrell |
| 3,266,477 A | | 8/1966 | Stiles |
| 3,357,916 A | | 12/1967 | Smith |
| 3,478,329 A | | 11/1969 | Etienne de Rudnay |
| 3,531,329 A | | 9/1970 | Selwitz |
| 3,649,566 A | * | 3/1972 | Hayes et al. ................. 502/313 |
| 4,255,290 A | | 3/1981 | Flagg et al. |
| 4,261,862 A | * | 4/1981 | Kinoshita et al. ........... 502/304 |
| 4,274,981 A | * | 6/1981 | Suzuki et al. ............... 502/178 |
| 4,369,132 A | | 1/1983 | Kinoshita et al. |
| 4,374,046 A | | 2/1983 | Antos |
| 4,425,261 A | | 1/1984 | Stenius et al. |
| 4,440,874 A | | 4/1984 | Thompson |
| 4,444,721 A | | 4/1984 | Ohkata |
| RE31,719 E | | 10/1984 | Sonetaka et al. |
| 4,495,304 A | * | 1/1985 | Yoo et al. ..................... 502/66 |
| 4,539,311 A | | 9/1985 | Harrison et al. |
| 4,548,921 A | | 10/1985 | Geus et al. |
| 4,716,087 A | | 12/1987 | Ito et al. |
| 4,738,947 A | * | 4/1988 | Wan et al. ................... 502/304 |
| 4,758,418 A | * | 7/1988 | Yoo et al. ............... 423/244.05 |
| 4,765,874 A | | 8/1988 | Modes et al. |
| 4,839,146 A | * | 6/1989 | Cho et al. ................. 423/213.5 |
| 4,857,499 A | | 8/1989 | Ito et al. |
| 4,904,633 A | | 2/1990 | Ohata et al. |
| 4,969,265 A | | 11/1990 | Ehara |
| 5,039,647 A | | 8/1991 | Ihara et al. |
| 5,068,218 A | | 11/1991 | Nishizawa |
| 5,108,469 A | | 4/1992 | Christ |
| 5,112,787 A | | 5/1992 | Falke et al. |
| 5,248,650 A | | 9/1993 | Sekiba et al. |
| 5,395,406 A | | 3/1995 | Clavenna et al. |
| 5,427,989 A | | 6/1995 | Kanesaka et al. |
| 5,446,003 A | | 8/1995 | Augustine et al. |
| 5,516,741 A | | 5/1996 | Gascoyne et al. |
| 5,610,117 A | * | 3/1997 | Horiuchi et al. ............. 502/324 |
| 5,622,048 A | | 4/1997 | Aoyama et al. |
| 5,640,847 A | | 6/1997 | Nakajima et al. |
| 5,644,912 A | | 7/1997 | Kawamura |
| 5,677,258 A | | 10/1997 | Kurokawa et al. |
| 5,750,458 A | | 5/1998 | Kennelly et al. |
| 5,814,576 A | | 9/1998 | Yamamoto |
| 5,814,577 A | | 9/1998 | Park et al. |
| 5,849,660 A | | 12/1998 | Takemoto et al. |
| 5,911,961 A | * | 6/1999 | Horiuchi et al. .......... 423/213.5 |
| 5,916,839 A | | 6/1999 | Pak et al. |
| 6,047,544 A | | 4/2000 | Yamamoto et al. |
| 6,057,263 A | | 5/2000 | Takahashi et al. |
| 6,066,410 A | | 5/2000 | Auer et al. |
| 6,066,587 A | | 5/2000 | Kurokawa et al. |
| 6,069,111 A | | 5/2000 | Yamamoto et al. |
| 6,080,371 A | | 6/2000 | Tanabe et al. |
| 6,107,239 A | | 8/2000 | Qin et al. |
| 6,110,862 A | | 8/2000 | Chen et al. |
| 6,172,000 B1 | * | 1/2001 | Chattha et al. ............... 502/324 |
| 6,180,075 B1 | * | 1/2001 | Lindner et al. ............ 423/213.2 |
| 6,228,800 B1 | | 5/2001 | Yamaguchi et al. |
| 6,284,201 B1 | | 9/2001 | Buck |
| 6,296,813 B1 | | 10/2001 | Ishii et al. |
| 6,370,870 B1 | | 4/2002 | Kamijo et al. |
| 6,444,610 B1 | | 9/2002 | Yamamoto |
| 6,475,446 B1 | | 11/2002 | Horiike et al. |
| 6,503,862 B1 | | 1/2003 | Yamamoto |
| 6,511,642 B1 | | 1/2003 | Hatanaka et al. |
| 6,514,905 B1 | | 2/2003 | Hanaki et al. |
| 6,518,213 B1 | | 2/2003 | Yamamoto et al. |
| 6,589,901 B2 | | 7/2003 | Yamamoto et al. |
| 6,623,716 B2 | | 9/2003 | Suga et al. |
| 6,660,897 B1 | * | 12/2003 | Marchal-George et al. .. 585/482 |
| 6,680,279 B2 | | 1/2004 | Cai et al. |
| 6,729,125 B2 | * | 5/2004 | Suga et al. .................... 60/285 |
| 6,764,665 B2 | | 7/2004 | Deeba et al. |
| 6,787,500 B2 | | 9/2004 | Ito et al. |
| 6,800,388 B2 | | 10/2004 | Kaneko et al. |
| 6,861,387 B2 | * | 3/2005 | Ruth et al. ................... 502/184 |
| 6,887,443 B2 | * | 5/2005 | Suga et al. ................ 423/239.1 |
| 6,887,444 B1 | | 5/2005 | Yamamoto |
| 6,896,857 B2 | | 5/2005 | Nakamura et al. |
| 6,926,875 B2 | | 8/2005 | Hatanaka et al. |
| 6,956,007 B2 | | 10/2005 | Cai et al. |
| 7,029,514 B1 | | 4/2006 | Yang et al. |
| 7,081,430 B2 | | 7/2006 | Uenishi et al. |
| 7,081,431 B2 | | 7/2006 | Yamashita et al. |
| 7,150,861 B2 | | 12/2006 | Morita et al. |
| 2001/0004832 A1 | | 6/2001 | Hanaki et al. |
| 2001/0006934 A1 | | 7/2001 | Kachi et al. |
| 2001/0021358 A1 | | 9/2001 | Kikuchi et al. |
| 2002/0045543 A1 | * | 4/2002 | Takatori et al. .............. 502/302 |
| 2003/0004054 A1 | | 1/2003 | Ito et al. |
| 2003/0083193 A1 | | 5/2003 | Takaya et al. |
| 2003/0167752 A1 | | 9/2003 | Niwa et al. |
| 2003/0181316 A1 | | 9/2003 | Hiramoto et al. |
| 2004/0055280 A1 | | 3/2004 | Nishizawa et al. |
| 2004/0254069 A1 | | 12/2004 | Ito |
| 2005/0170958 A1 | | 8/2005 | Kikuchi et al. |
| 2005/0221978 A1 | | 10/2005 | Shiratori et al. |
| 2007/0153390 A1 | | 7/2007 | Nakamura et al. |
| 2007/0155626 A1 | | 7/2007 | Yasuda et al. |
| 2007/0167319 A1 | | 7/2007 | Shiratori et al. |
| 2007/0203021 A1 | | 8/2007 | Nakamura et al. |
| 2007/0244001 A1 | | 10/2007 | Wakamatsu et al. |

FOREIGN PATENT DOCUMENTS

| | | |
|---|---|---|
| EP | 0 931 590 B1 | 7/1999 |
| EP | 0 940 176 A2 | 9/1999 |
| EP | 1 043 065 A1 | 10/2000 |
| EP | 1 494 304 A1 | 1/2005 |
| JP | 56-010333 A | 2/1981 |
| JP | 58-186441 A | 10/1983 |
| JP | 07-246343 A | 12/1984 |
| JP | 59-230639 A | 12/1984 |
| JP | 09-122492 A | 5/1997 |
| JP | 10-216517 A | 8/1998 |
| JP | 11-057473 A | 3/1999 |
| JP | 11-314035 A | 11/1999 |
| JP | 2000-001119 A | 1/2000 |
| JP | 2000-015098 A | 1/2000 |
| JP | 2000-042411 A | 2/2000 |
| JP | 2000-279824 A | 10/2000 |
| JP | 2000-296339 A | 10/2000 |
| JP | 2001-198466 A | 7/2001 |
| JP | 3251009 B2 | 11/2001 |
| JP | 2002-066335 A | 3/2002 |
| JP | 2002-102703 A | 4/2002 |
| JP | 2002-233755 A | 8/2002 |
| JP | 2002-355558 A | 12/2002 |
| JP | 2002-361086 A | 12/2002 |
| JP | 2003-080077 A | 3/2003 |
| JP | 2003-126694 A | 5/2003 |
| JP | 2003-144923 A | 5/2003 |
| JP | 2003-164764 A | 6/2003 |
| JP | 2003-181290 A | 7/2003 |
| JP | 2003-181293 A | 7/2003 |
| JP | 2003-290658 A | 10/2003 |
| JP | 2003-290667 A | 10/2003 |
| JP | 2003-311128 A | 11/2003 |
| JP | 2004-016838 A | 1/2004 |
| JP | 2004-043217 A | 2/2004 |
| JP | 2004-082000 A | 3/2004 |
| JP | 2004-174490 A | 6/2004 |
| JP | 2004-267961 A | 9/2004 |
| JP | 2005-081183 A | 3/2005 |
| JP | 2005-305300 A | 11/2005 |

| | | | |
|---|---|---|---|
| WO | WO-95/32790 A1 | 12/1995 | |
| WO | WO 97/09114 A1 | 3/1997 | |
| WO | WO 2005/063390 A1 | 7/2005 | |
| WO | WO-2005/063391 A1 | 7/2005 | |

OTHER PUBLICATIONS

Eriksson, S., et al., "Preparation of Catalysts from Microemulsions and Their Applications in Heterogeneous Catalysis," Applied Catalysis A: General, vol. 265, No. 2, Jul. 8, 2004, pp. 207-219.

T. Shimizu et al., "Size Evolution of Alkanethiol-Protected Gold Nanoparticles by Heat Treatment in the Solid State", J. Phys. Chem. B, 107, 2003, pp. 2719-2724.

U.S. Appl No. 11/079,270, filed Mar. 15, 2005, Wakamatsu et al.

U.S. Appl. No. 11/079,377, filed Mar. 15, 2005, Shiratori.

U.S. Appl. No. 11/722,275, filed Jun. 20, 2007, Nakamura et al.

A. Martínez-Arias et al., "Study of the lean NOx reduction with C3H6 in the presence of water over silver/alumina catalysts prepared from inverse microemulsions," Applied Catalysts B: Environmental, vol. 28, 2000, pp. 29-41.

H. Wakamatsu et al., US PTO Office Action U.S. Appl. No. 11/578,295, Mar. 19, 2009, 8 pgs.

H. Wakamatsu et al., US PTO Office Action U.S. Appl. No. 11/578,295, Oct. 2, 2008, 15 pgs.

H. Yasuda et al., US PTO Office Action U.S. Appl. No. 10/586,533, dated Jul. 14, 2008, 6 pgs.

H. Yasuda et al., US PTO Office Action U.S. Appl. No. 10/586,533, dated Nov. 18, 2008, 16 pgs.

K. Shiratori, et al., US PTO Office Action U.S. Appl. No. 10/584,346, dated Jul. 11, 2008, 5 pgs.

K. Shiratori, et al., US PTO Office Action U.S. Appl. No. 10/584,346, dated Nov. 18, 2008, 19 pgs.

K. Shiratori, et al., US PTO Office Action U.S. Appl. No. 11/079,377, dated Mar. 12, 2009, 7 pgs.

K. Shiratori, et al., US PTO Office Action U.S. Appl. No. 11/079,377, dated May 8, 2008, 6 pgs.

K. Shiratori, et al., US PTO Office Action U.S. Appl. No. 11/079,377, dated Jul. 28, 2008, 18 pgs.

M. Che et al., "A Study of the Chemisorption of Nitric Oxide on PdY Zeolite, Evidence for a Room Temperature Oxidative Dissolution of Pd Crystallities," The Journal of Physical Chemistry, vol. 60, No. 21, 1976, 11 pgs.

M. Nakamura et al., US PTO Notice of Allowance, U.S. Appl. No. 10/589,890, dated May 7, 2009, 13 pgs.

M. Nakamura et al., US PTO Office U.S. Appl. No. 10/589,890, dated Jul. 15, 2008, 5 pgs.

M. Nakamura et al., US PTO Office U.S. Appl. No. 10/589,890, dated Nov. 19, 2008, 13 pgs.

M. Nakamura et al., US PTO Office Action U.S. Appl. No. 10/584,243, dated Aug. 6, 2008, 5 pgs.

M. Nakamura et al., US PTO Office Action U.S. Appl. No. 10/584,243, dated Dec. 26, 2008, 24 pgs.

PH. Buffat and J-P Borel, "Size effect on the melting temperature of gold particles," Physical Review A, Jun. 1976, vol. 13, No. 6, 12 pgs.

T. Kinoshita et al., "Magnetic evaluation of nanostructure of gold-iron composite particles synthesized by a reverse micelle method," Journal of Alloys and Compounds, vol. 359, No. 1-2, Sep. 22, 2003, pp. 46-50.

Masanori Nakamura et al., PTO Notice of Allowance, U.S. Appl. No. 10/584,243, Jun. 11, 2009, 15 pages.

Hirofumi Yasuda et al., PTO Notice of Allowance, U.S. Appl. No. 10/586,533, Jun. 12, 2009, 14 pages.

H. Yamada et al., US PTO Notice of Allowance, U.S. Appl. No. 10/586,533, dated Jun. 12, 2009, 14 pgs.

M. Nakamura et al., US PTO Notice of Allowance, U.S. Appl. No. 10/584,243, dated Jun. 11, 2009, 14 pgs.

Masanori Nakamura, U.S. PTO Office Action, U.S. Appl. No. 11/722,275, dated Sep. 14, 2009, 23 pgs.

\* cited by examiner

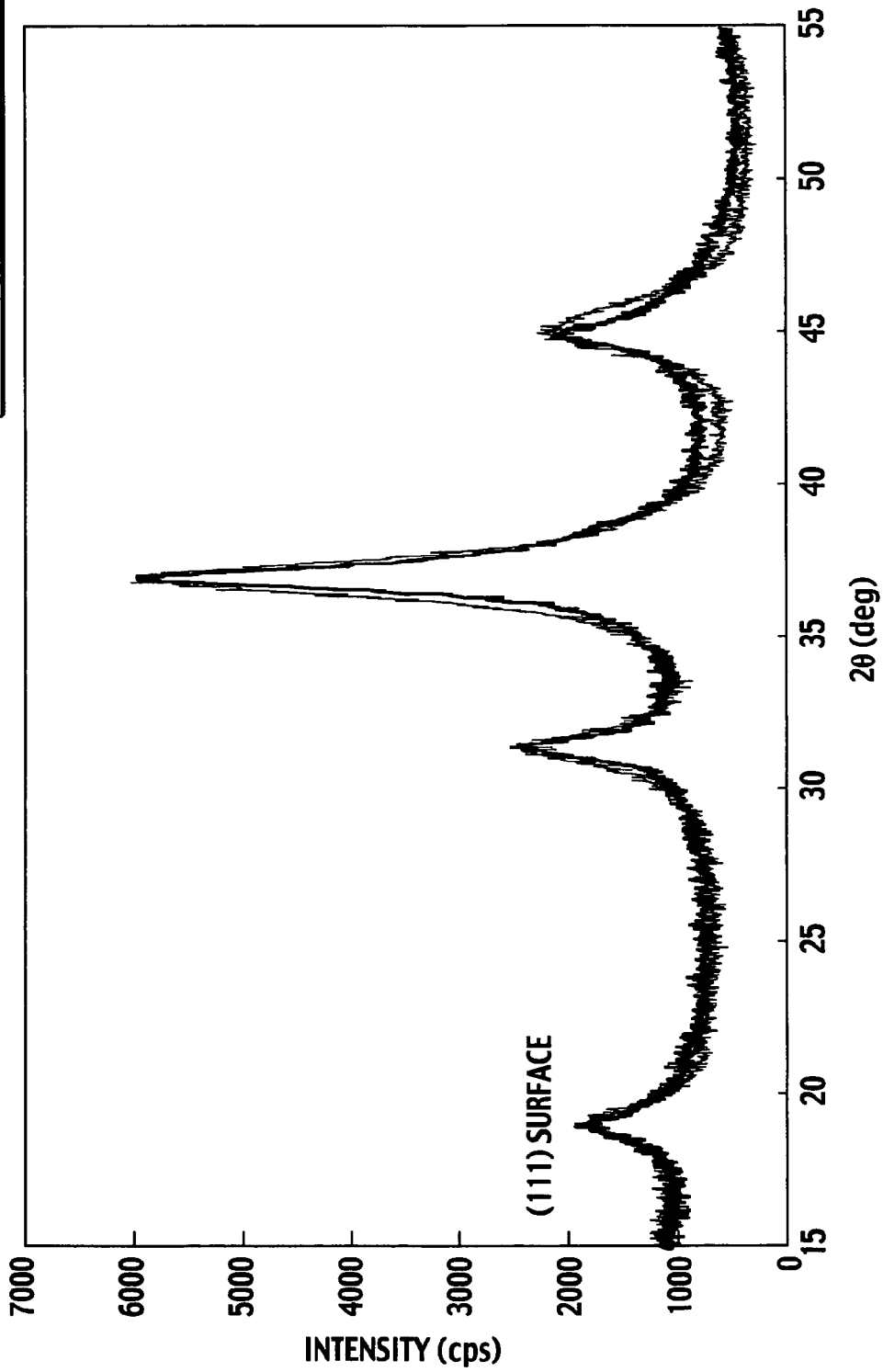

CATALYST POWDER, EXHAUST GAS PURIFYING CATALYST, AND METHOD OF PRODUCING THE CATALYST POWDER

BACKGROUND OF THE INVENTION

1. Field of the Invention

The present invention relates to catalyst powder, an exhaust gas purifying catalyst, and a method of producing the catalyst powder, and particularly, to an exhaust gas purifying catalyst which purifies exhaust gas discharged from an internal combustion engine.

2. Description of the Related Art

In general, a three-way catalyst is used in order to purify exhaust gas which is discharged from an internal combustion engine such as an automotive engine and contains hydrocarbon (HC), carbon monoxide (CO) and nitrogen oxide (NOx). As an example of the three-way catalyst, one in which noble metal particles of platinum (Pt), palladium (Pd), rhodium (Rh) and the like are carried on a carrier of alumina ($Al_2O_3$) or the like as a porous body is given.

Moreover, a three-way catalyst in which catalyst powder formed by carrying ones to be described below on active alumina by an impregnation method is carried on a honeycomb substrate is proposed (refer to Japanese Patent Laid-Open Publication No. S59-230639). The ones carried on the honeycomb substrate are: at least one selected from the group consisting of cerium (Ce), zirconium (Zr), iron (Fe) and nickel (Ni); at least one selected from the group consisting of neodymium (Nd), lanthanum (La) and praseodymium (Pr) according to needs; and further, at least one selected from the group consisting of Pt, Pd and Rh. Furthermore, an exhaust gas purifying catalyst is proposed, which is configured such that at least one or more oxides of cobalt (Co), nickel, iron, chromium (Cr) and manganese (Mn) and at least one of Pt, Rh and Pd form a solid solution by the impregnation method on an interface where the above selected substances contact each other (refer to Japanese Patent Publication No. 3251009).

In recent years, in response to tightening of regulations on the exhaust gas, an amount of catalyst to be used per automobile has been increased. An increase of an amount of noble metal to be used per automobile leads to an increase of cost of the automobile, and accordingly, it is desired to reduce the amount of noble metal to be used for the catalyst.

Moreover, a catalytic reaction using the noble metal is a contact reaction which progresses on a surface of the noble metal, and accordingly, a catalytic activity of the noble metal is substantially proportional to a surface area of the noble metal. Therefore, in order to obtain the maximum catalytic activity from a small amount of the noble metal, it is preferable to produce noble metal particles with a small particle diameter and a large specific surface area, and to evenly disperse the noble metal particles on the porous carrier while maintaining the particle diameter.

SUMMARY OF THE INVENTION

However, the noble metal particles with a particle diameter of less than 10 nm have high surface reactivity and large surface energy though the catalytic activity thereof is high. Accordingly, the noble metal particles are very unstable. Moreover, a melting point of the noble metal particles is radically lowered when the particle diameter becomes 5 nm or less (refer to *J. Phys. Chem. B*, 107, pp. 2719 to 2724 (2003)). Therefore, the noble metal particles come close to one another, leading to easy aggregation thereof. In particular, Pt significantly aggregates when being heated. Even if the Pt is evenly dispersed on the carrier, the Pt aggregates by being heated, and the particle diameter thereof is enlarged. Therefore, a function of the Pt as a three-way catalyst, that is, purification rates thereof for HC, CO and NOx are lowered. Because the automotive catalyst is exposed to high temperature of 800 to 900° C. in usual, and more than 1000° C. according to cases, it is difficult to prevent the aggregation of the noble metal particles with the small particle diameter and maintain the particle diameter at the time of production. Accordingly, the aggregation of the noble metal particles becomes the largest problem in establishing the exhaust gas purifying catalyst with a small amount of noble metal.

In order to prevent the aggregation of the noble metal particles, for example, it is conceived to lower the surface energy of the noble metal particles. However, in order to restrict the surface energy, it is necessary to increase the diameter of the noble metal particles to a large one such as 50 nm and 100 nm, and in the case of such a large diameter, the catalytic activity itself is lowered to a great extent. In addition, the exhaust gas purifying catalyst using these noble metals have heretofore been produced by the impregnation method. An example of preparing the catalyst powder by the impregnation method is shown in FIGS. 10A to 10D. First, an aqueous solution of transition metal salt is added to a carrier 70 (FIG. 10A) such as alumina, and transition metal 71 is carried on the carrier 70 by impregnation (FIG. 10B). Subsequently, an aqueous solution of noble metal salt is added to the carrier 70, and noble metal 72 is carried thereon by impregnation (FIG. 10C). Moreover, the carrier 70 on which the transition metal 71 and the noble metal 72 are carried is dried/baked, thereby obtaining catalyst powder 73 (FIG. 10D).

However, the catalyst powder 73 obtained by the impregnation method is one in which the noble metal 72 and the transition metal 71 are carried on the carrier 70 separately from each other. Moreover, using the impregnation method, the noble metal 72 aggregates on the carrier 70 by being heated up to increase the particle diameter thereof even if the particle diameter is small at the time of producing the catalyst powder. Accordingly, the catalytic activity has been lowered, and sufficient heat resistance has not been obtained.

The present invention is one made focusing attention on the above-described conventional problems inherent in the related art. It is an object of the present invention to provide catalyst powder which restricts the aggregation of the noble metal particles even at the high temperature and is excellent in the catalytic activity, and to provide an exhaust gas purifying catalyst using the catalyst powder, and a method of producing the catalyst powder.

The first aspect of the present invention provides catalyst powder comprising: a composite compound containing transition metal and base-metal; and a noble metal particle which is in contact with the composite compound and has a particle diameter of 1 nm to 10 nm.

The second aspect of the present invention provides a method of producing catalyst powder comprising: precipitating a transition metal particle and a base-metal compound in a reversed micelle substantially simultaneously; and precipitating a noble metal particle in the reversed micelle.

The third aspect of the present invention provides a method of producing catalyst powder comprising: preparing a reversed micellar solution including a reversed micelle containing a transition metal salt-containing aqueous solution and a base-metal salt-containing aqueous solution; precipitating a transition metal particle and a base-metal compound in the reversed micelle substantially simultaneously by mixing a precipitant into the reversed micellar solution; mixing a noble metal salt-containing aqueous solution into the reversed micellar solution after the transition metal particle and the base-metal compound are precipitated; and precipitating a noble metal particle in the reversed micelle by mixing a reducing agent into the reversed micellar solution.

The fourth aspect of the present invention provides a method of producing catalyst powder comprising: preparing a reversed micellar solution including a reversed micelle containing a noble metal salt-containing aqueous solution; precipitating a noble metal particle in the reversed micelle by mixing a reducing agent into the reversed micellar solution; mixing a transition metal salt-containing aqueous solution and a base-metal salt-containing aqueous solution into the reversed micellar solution after the noble metal particle is precipitated; and precipitating a transition metal particle and a base-metal compound in the reversed micelle substantially simultaneously by mixing a precipitant into the reversed micellar solution.

The fifth aspect of the present invention provides an exhaust gas purifying catalyst comprising: catalyst powder including: a composite compound containing transition metal and base-metal; and a noble metal particle which is in contact with the composite compound and has a particle diameter of 1 nm to 10 nm, wherein an amount of the noble metal is 0.7 g or less per 1 L of a volume of the exhaust gas purifying catalyst.

BRIEF DESCRIPTION OF THE DRAWINGS

The invention will now be described with reference to the accompanying drawings wherein;

FIG. 9 is a graph showing measurement results of XRD in Example 1 and Comparative example 1;

DETAILED DESCRIPTION OF THE PREFERRED EMBODIMENT

Details of catalyst powder, an exhaust gas purifying catalyst, and a method of producing the catalyst powder, which are according to the present invention, will be described below based on embodiments.

(Catalyst Powder)

Figure 1A:
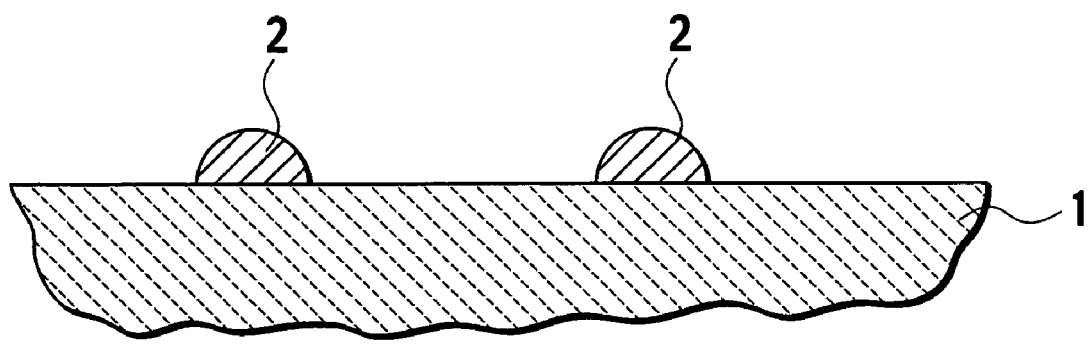
FIG. 1A is a schematic cross-sectional view showing a state of catalyst powder according to the present invention when being produced.

An embodiment of the catalyst powder according to the present invention will be described. As shown in FIG. 1A, the catalyst powder according to this embodiment is characterized by including a composite compound 1 containing transition metal and base-metal, and noble metal 2 which is in contact with the composite compound 1 and has a particle diameter of 1 nm to 10 nm.

An exhaust gas purification reaction, that is, a purification reaction for HC, CO and NOx as harmful components in exhaust gas progresses on noble metal singly having high activity in the first place. However, even if an amount of the noble metal 2 is decreased, catalytic activity performance thereof is maintained by bringing the noble metal 2 in contact with the composite compound 1 formed of the transition metal and the base-metal, each of which has difficulty exerting the catalyst activity singly.

As one of reasons for the above, it is conceived that formation of the composite compound by the transition metal and the base-metal improves heat resistance of the composite compound itself as a carrier carrying the noble metal. In usual, an oxide of the base-metal is used as the carrier. In particular, alumina among the base-metals causes a phase transition when being exposed to a high temperature of 650° C. or more, and accordingly, a shape of the alumina itself is broken. In this case, a possibility is high that particles of the noble metal carried on the carrier come close to one another to then aggregate owing to the phase transition of the carrier. However, when the transition metal and the base-metal form a substantially even composite compound, the composite compound itself becomes difficult to cause the phase transition, and accordingly, dispersivity of the noble metal carried on the carrier can be maintained. Therefore, in the case of the noble metal particles with the particle diameter of 1 nm to 10 nm, the aggregation of the noble metal can be prevented, the heat resistance of the catalyst powder can be enhanced, and accordingly, the amount of noble metal usage can be decreased.

Figure 1B:
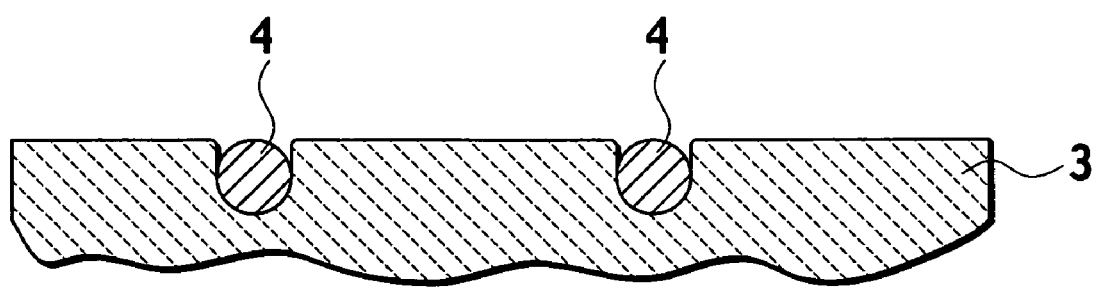
FIG. 1B is a schematic cross-sectional view showing another state of the catalyst powder according to the present invention when being produced.

Moreover, as shown in FIG. 1B, with regard to a contact state of the noble metal and the composite compound, a state is preferable where noble metal particles 4 are partially buried in a composite compound 3. In this case, the composite compound 3 functions as an anchor which controls a movement of the noble metal particles on a surface of the carrier, and accordingly, the aggregation of the noble metal 4 can be controlled more effectively. As described above, when the particle diameter of the noble metal is 10 nm or less, the noble metal is prone to aggregate. However, in the catalyst powder according to the present invention, the noble metal particles 4 are partially buried in the composite compound 3. Accordingly, such an anchor effect of the composite compound is significantly exerted, and a state of the catalyst powder when being produced is maintained even after being heated. As described above, a dispersed state of the noble metal when the catalyst powder is produced is maintained even after a heat durability test. Accordingly, it is made possible to obtain catalyst powder in which the catalytic activity is maintained and the heat resistance is excellent.

Figure 10A:
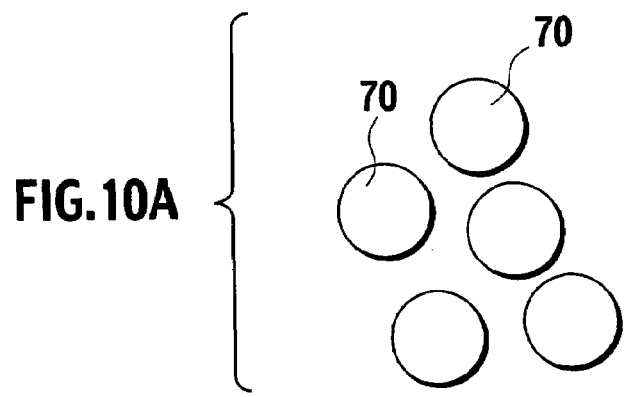
FIG. 10A is a schematic view showing a carrier.
Figure 10B:
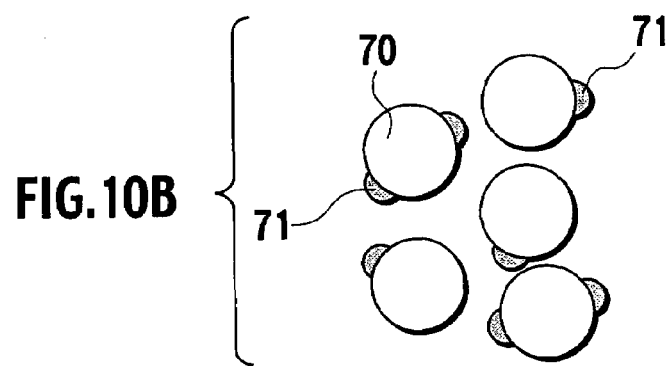
FIG. 10B is a schematic view showing a state where transition metal is carried on the carrier.
Figure 10C:
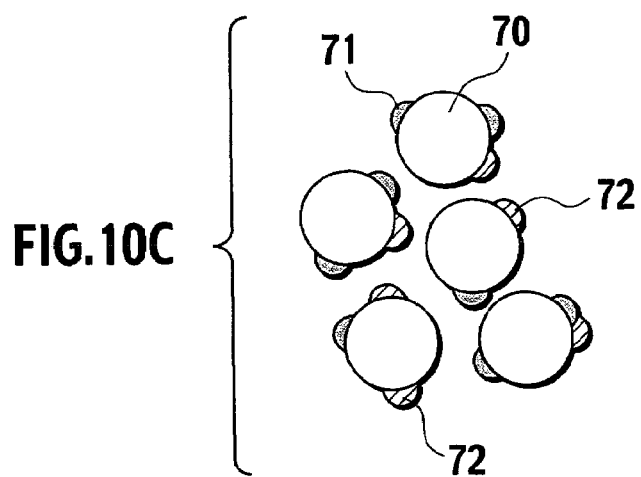
FIG. 10C is a schematic view showing a state where the transition metal and noble metal are carried on the carrier.
Figure 10D:
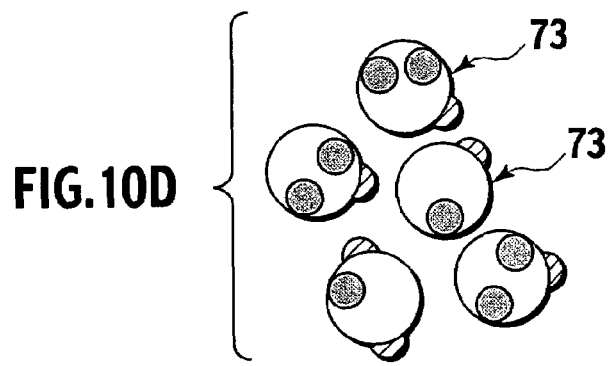
FIG. 10D is an explanatory view showing catalyst powder obtained by an impregnation method.

Furthermore, as another reason, it is conceived that the noble metal is in contact with the composite compound containing the transition metal, resulting in an improvement of purification performance itself of the catalyst powder. Specifically, a phenomenon called a spillover is conceived to be a factor of maintaining the performance of the catalyst powder. In the spillover, exhaust gas molecules are first adsorbed onto the surfaces of the noble metal particles, then move therefrom to the surface of the composite compound, and are purified on the surface of the composite compound. Specifically, the noble metal contacts the composite compound containing the transition metal, and thus the noble metal functions not only as the catalyst but also as a site of adsorbing the exhaust gas. Accordingly, the transition metal in the composite compound is activated to function as a site which executes the purification reaction. The above is conceived to be the factor. Note that, as shown in FIG. 10D, in the case of the conventional catalyst powder produced by the impregnation method, the transition metal 71 and the noble metal 72 are carried on the carrier 70 without being brought into contact with each other, and therefore, only the noble metal 72 executes the exhaust gas purification. As described above, in the catalyst powder of this embodiment, an effect of supplementing the catalytic activity of the noble metal by the composite compound containing the transition metal is obtained. Therefore, the amount of noble metal usage can be decreased.

Note that, when the composite compound is uneven, coarse particles of the transition metal become prone to be formed. In this case, lowering of the contact of the composite compound and the noble metal and lowering of a probability of contact of the catalyst powder with such reaction gas become prone to occur. Accordingly, it is preferable that the composite compound be as even as possible.

Moreover, it is preferable that the noble metal be not only in the state of being carried on the outer surface of the composite compound as shown in FIG. 1A but also in a state of being buried in the composite compound. The catalyst powder according to this embodiment is exposed to a high temperature of 200° C. or more when being produced. Accordingly, pores are formed in the produced composite compound. Then, such formation of the pores increases the surface area of the entire catalyst powder and an adsorbed amount of the exhaust gas. Moreover, the formation of the pores allows the exhaust gas to come and go through the catalyst powder particles. Accordingly, the noble metal and the exhaust gas come into contact with each other even if the noble metal is buried in the composite compound. Accordingly, the exhaust gas is purified efficiently.

As described above, the catalyst powder according to this embodiment can restrict the aggregation of the noble metal even after the heat durability test, and accordingly, the dispersed state of the catalyst powder when being produced is maintained. Moreover, the particle diameter of the noble metal is maintained, and therefore, the catalytic activity can be maintained, and it is made possible to obtain the catalyst powder excellent in heat resistance. Furthermore, the composite compound and the noble metal are in contact with each other, and thus the function of the transition metal in the composite compound as that of the catalyst powder is drawn. Accordingly, the amount of noble metal can be decreased.

Note that the composite compound may be partially or entirely in a state of an oxide, or may be in a state of partially containing an alloy. Moreover, a valence of a part of the transition metal in the composite compound may be zero, and specifically, a part of the transition metal may be in a metal state. When a part of the transition metal is in the metal state, the catalytic activity is higher than that when all of the transition metal is the oxide, bringing a possibility to improve exhaust gas purification efficiency.

Furthermore, it is preferable that the degree of dispersion of the noble metal be 50% or more. The degree of dispersion is present as a scale for measuring a distribution state of the noble metal. The degree of dispersion is referred to as a ratio of noble metal atoms exposed to the surface of the carrier among the atoms dispersed in the carrier. The degree of dispersion is a magnitude to be determined by a size and shape of the noble metal. In usual, it is the atoms present on the surface of the carrier that function effectively as the catalyst powder. Accordingly, in general, a high degree of dispersion is required. As one of measurement methods of the degree of dispersion, there is a method for measuring an adsorbed amount of carbon monoxide (CO) by adsorbing the carbon monoxide on the surface of the noble metal. When the noble metal is in the state of being partially buried in the carrier as shown in FIG. 1B, the exposed ratio of the noble metal is smaller than in FIG. 1A. In the catalyst powder of this application, it is preferable that the degree of dispersion of the noble metal, which is obtained by the measurement method described above, be at least 50% or more. When the degree of dispersion is less than 50%, the performance of the noble metal is lowered as the catalyst powder.

Moreover, it is preferable that the noble metal be noble metal selected from the group consisting of platinum (Pt), palladium (Pd), rhodium (Rh), iridium (Ir), ruthenium (Ru) and gold (Au). Two or more of the noble metals, for example, Pt and Rh may be mixed together. Furthermore, it is preferable that the transition metal be transition metal selected from the group consisting of iron (Fe), cobalt (Co), nickel (Ni), manganese (Mn), copper (Cu) and zinc (Zn). Two or more of the transition metals may be mixed together for use. Still further, it is preferable that the base-metal be at least one or more of base-metals selected from the group consisting of aluminum (Al), silicon (Si) and titanium (Ti). Two or more of the base-metals may be mixed together for use.

Furthermore, it is preferable that the composite compound contain a spinel compound. Here, the spinel compound has one of crystal structures of which chemical formulae are represented as $BC_2O_4$ (B: divalent metal; C: trivalent metal; and O: oxygen). Oxygen atoms form a cubic close-packed structure (face-centered cubic structure). B occupies one-eighth of a tetrahedral gap, and C occupies a half of an octahedral gap. Note that, in this embodiment, B is an element selected from the above-described transition metals, and C is an element selected from the above-described base-metals. In order to enhance the catalytic activity, it is necessary to evenly disperse the noble metal on the carrier, and accordingly, the heat resistance is required for the carrier. In order to improve the heat resistance of the carrier, it is conceived to use a thermally stable porous substance (for example, $\alpha\text{-}Al_2O_3$).

However, α-Al$_2$O$_3$ has a small specific surface area, a distance between the noble metal particles carried thereon is shortened, and the aggregation occurs. As opposed to this, the spinel compound forms a stable spinel structure to a high-temperature range, and accordingly, the heat resistance of the composite compound as the carrier is improved, and the catalytic activity is maintained. Note that, in the composite compound, all thereof may be the spinel compound, or a part thereof may be the spinel compound. Among the metals, it is more preferable that the noble metal be Pt, the transition metal be Co, and the base-metal be Al. In this case, Co easily reacts with Al, thereby forming CoAl$_2$O$_4$ (cobalt aluminate) as the composite compound. Cobalt aluminate has a higher heat resistance and a more stable crystalline structure than those of alumina as a conventional carrier, and therefore, can prevent the aggregation of Pt.

Furthermore, as a method for improving the heat resistance of the composite compound as the carrier, it is preferable that the catalyst powder contain at least one or more elements selected from the group consisting of cerium (Ce), neodymium (Nd), praseodymium (Pr), lanthanum (La), zirconium (Zr), barium (Ba) and magnesium (Mg). These metal elements enter between the particles of the even composite compound of the transition metal and the base-metal, and cause the aggregation of the particles of the composite compound. Therefore, the phase transition of the composite compound as the carrier is restricted to improve the heat resistance, thus making it possible to restrict the aggregation of the noble metal.

As described above, the catalyst powder according to the present invention includes the composite compound containing the transition metal and the base-metal, and the noble metal which is in contact with the composite compound and has the particle diameter of 1 nm to 10 nm. Thus, the aggregation of the noble metal can be restricted, thus making it possible to obtain the catalyst powder excellent in heat resistance. Hence, the activity of the catalyst powder when being produced is maintained. Moreover, the effect of supplementing the activity of the noble metal by the transition metal is obtained, thus making it possible to reduce the amount of noble metal usage.

(Method of Producing Catalyst Powder)

Next, an embodiment of the method of producing catalyst powder according to the present invention will be described.

Figure 2:
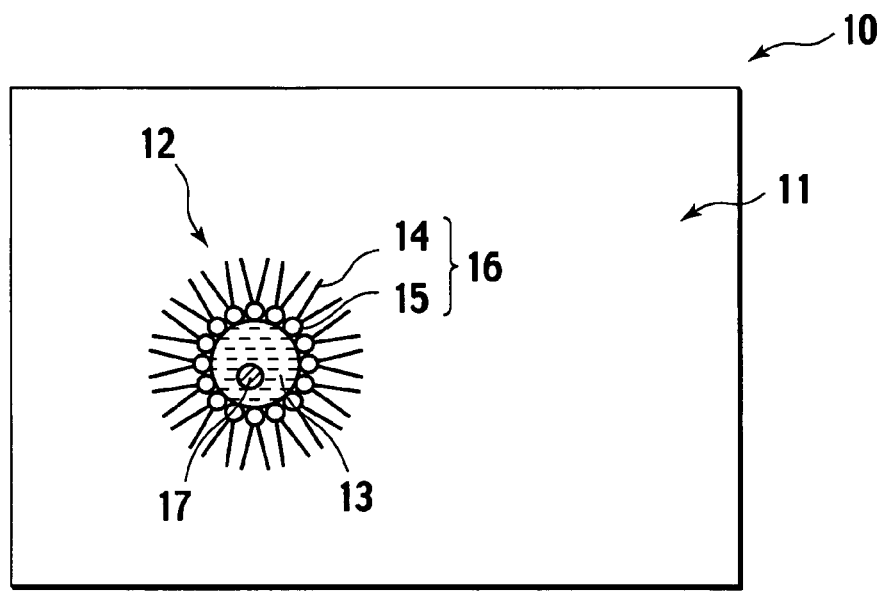
FIG. 2 is a view for explaining a reversed micellar solution.

The method of producing catalyst powder according to the present invention is characterized by producing the catalyst powder by use of a reversed micelle method. Use of this method makes it possible to adjust the size of the metal particles and to prepare catalyst powder with an even particle diameter. In the reversed micelle method, a "reversed micellar solution" as shown in FIG. 2 is used. The reversed micellar solution is a solution composed of an organic solvent 11, an aqueous solution 13 containing noble metal ions, and amphiphiles 16 such as a surfactant. In the reversed micellar solution 10, the aqueous solution 13 and the amphiphiles 16 aggregate in the organic solvent 11, thus forming a reversed micelle 12. The aqueous solution 13 exists in an inside of the reversed micelle 12. In the organic solvent phase, each amphiphile 16 orients a hydrophobic group 14 to the outside, that is, to the organic solvent phase side, and orients a hydrophilic group 15 to the inside, that is, to the aqueous phase side. The orientations of the hydrophobic group 14 and the hydrophilic group 15 are reverse to those in the case of an aqueous solvent, and accordingly, this solution 10 is referred to as the reversed micellar solution. The reversed micellar solution as described above can be prepared by adding an aqueous solution to a solution having the amphiphiles dissolved in the organic solvent and by agitating an obtained mixture. A portion where the hydrophilic groups aggregate has a capability of holding polar molecules of water and the like. The aqueous solution concerned turns to extremely small droplets with a diameter of several nanometers to several ten nanometers, and is stably dispersed in the organic solvent. The size of the water droplets can be controlled by a molar ratio of injected water and the surfactant.

Figure 3:
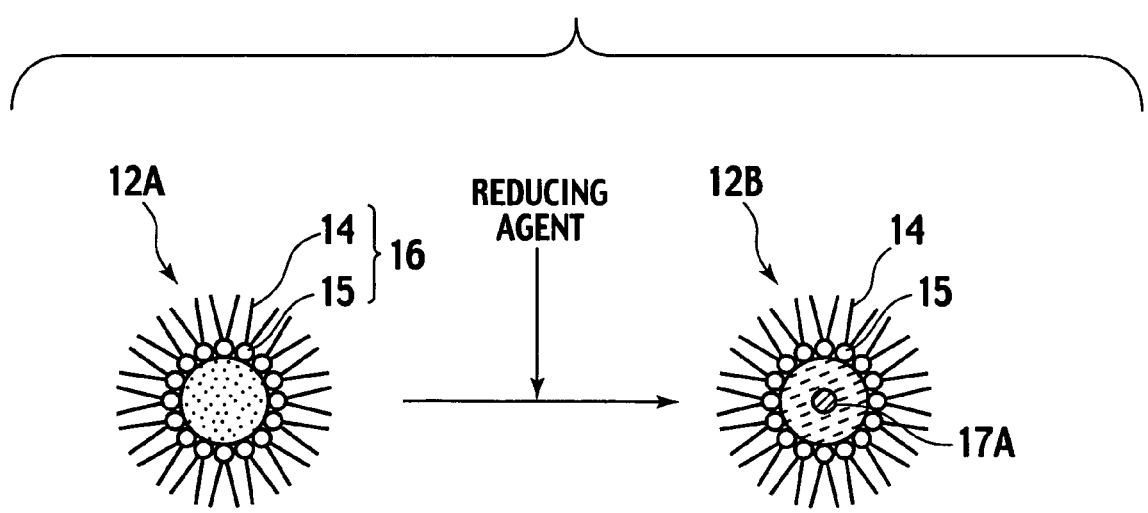
FIG. 3 is a view for explaining precipitation of a metal particle in a reversed micelle.

When a reducing agent which precipitates the noble metal ions is added to the reversed micellar solution 10 containing the noble metal ion aqueous solution 13 in each reversed micelle 12, the noble metal ions are reduced to the noble metal in the inside of the reversed micelle 12, and turn to a colloidal noble metal particle 17. The reducing agent may be added as an aqueous solution, or may be added as a reversed micellar solution containing the reducing agent concerned in insides of micelles. Specific description will be made by use of FIG. 3. FIG. 3 shows the case where the reducing agent is added as the aqueous solution. First, the surfactant 16 is mixed into the organic solvent, and the noble metal ion aqueous solution is added to a resultant. Then, a reversed micelle 12A is formed, in which the hydrophilic groups 15 are placed inside, and the hydrophobic groups 14 are placed outside. The noble metal ion aqueous solution is contained in the inside of the reversed micelle 12A. When the reducing agent is mixed into this reversed micellar solution, the reducing agent enters into the inside of the reversed micelle 12A, and a reduction reaction progresses in the reversed micelle 12A. Furthermore, when a particle 17A precipitated by reducing the noble metal ions is aged, a reversed micelle 12B containing the colloidal noble metal controlled by a micelle size can be obtained. Note that two or more of the noble metal ions or precursors of the transition metal and the carrier may be contained in the noble metal ion aqueous solution in the micelle. The inside of the micelle is excellent in dispersivity, and even if the two or more of noble metal ions are contained therein, a noble metal particle having an extremely even composition can be obtained.

As opposed to this, the impregnation method which has heretofore been used for producing the catalyst powder is a method for carrying the noble metal and the like, in which a solution containing the noble metal and the like is impregnated into pores of the carrier to fix the noble metal to a pore wall, followed by drying and baking thereof. In the case of producing the catalyst powder by this impregnation method, the particle diameter of the noble metal becomes as extremely small as 1 nm or less, and heat resistance thereof is lowered. Meanwhile, the production of the catalyst powder by use of the reversed micelle method enables the particle diameter of the noble metal to be controlled to a size of 1 nm to 10 nm, and preferably, 3 nm to 8 nm. Moreover, it is made possible to control the size of the catalyst powder as a whole.

The method of producing catalyst powder according to the present invention is a method of producing catalyst powder by using a reversed micelle with a diameter of 20 nm or less, characterized by including the step of precipitating the transition metal particle and the base-metal compound in the reversed micelle substantially simultaneously, and the step of precipitating the noble metal particle in the reversed micelle singly. Specifically, the method is characterized in that the transition metal particle and the base-metal compound are first precipitated in one reversed micelle, and the noble metal particle is then precipitated in the same reversed micelle.

In the method of producing catalyst powder according to the present invention, the transition metal and the base-metal are precipitated in the reversed micelle substantially simultaneously, thereby facilitating the production of the composite compound of the transition metal and the base-metal, and particularly, the spinel compound. When the base-metal are precipitated in the reversed micelles substantially simultaneously, particles of a hydroxide are formed. Then, when the particles are baked, powder is produced, in which many gaps exist in the particle, a specific surface area is large, and catalytic activity is high, owing to vaporization of water. In this case, the composite compound as the carrier carrying the noble metal is stabilized, and in the composite compound itself, the phase transition becomes difficult to occur. Accordingly, dispersivity of the noble metal carried on the carrier can be maintained, and the heat resistance thereof can be enhanced. Note that an amount of the transition metal is made somewhat larger than a stoichiometric amount thereof, thus facilitating the formation of the even spinel compound more. Moreover, in the case of using cobalt as the transition metal and aluminum as the base-metal, it is facilitated to form cobalt aluminate as the spinel compound because affinity of cobalt and aluminum is high.

Note that it is preferable to perform the step of precipitating the transition metal particle and the base-metal compound in the reversed micelle substantially simultaneously prior to the step of precipitating the noble metal particle in the reversed micelle singly. In this case, when the reversed micelle is decayed to form a deposit, it is made possible to place the noble metal on an outer surface of the particle formed by compounding the transition metal and the base-metal. Then, when the deposit is baked, a state appears, in which the noble metal is partially buried in the composite compound. Therefore, the composite compound functions as an anchor for the noble metal, and accordingly, the aggregation of the noble metal is restricted, and the state of the catalyst powder when being produced can be maintained even after being heated, thus making it possible to obtain the catalyst powder excellent in heat resistance.

Figure 4:
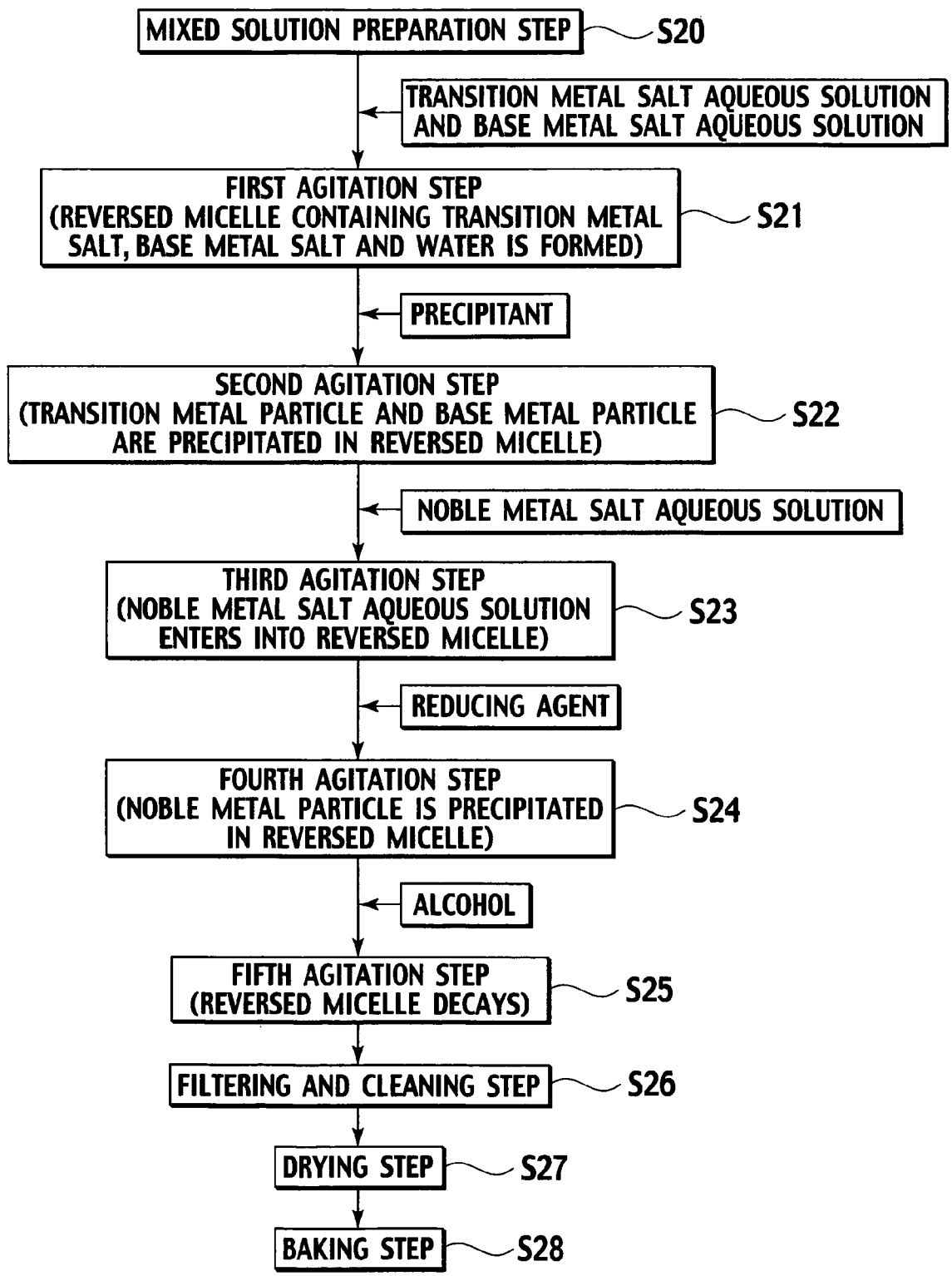
FIG. 4 is a process chart explaining a method of producing the catalyst powder according to the present invention.

In FIG. 4, a schematic process of the method of producing the catalyst powder is shown. With regard to the preparation of the catalyst powder, first, a mixed solution in which the surfactant is dissolved in the organic solvent is prepared (Step S20). Here, as the organic solvent, cyclohexane, cycloheptane, octanol, isooctane, n-hexane, n-decane, benzene, toluene, xylene, and the like are usable. Moreover, a mixed solution of two or more of these solvents may be used. As the surfactant, polyethylene glycol-p-nonylphenyl ether, pentaethylene glycol dodecyl ether, and the like are usable.

Figure 5A:
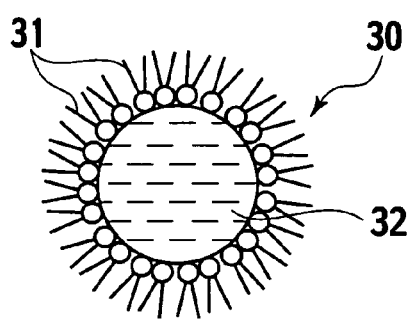
FIG. 5A is a schematic view showing the reversed micelle.

Into this solution, a mixed aqueous solution containing transition metal salt and base-metal salt is added, and an obtained mixture is agitated. Then, a reversed micelle 30 as shown in FIG. 5A is formed. In the reversed micelle 30, on the periphery of a spherical droplet with a diameter of a little more than ten nanometers, the surfactant 31 is arrayed such that the hydrophilic groups face inside and that the hydrophobic groups face outside. In an aqueous phase in the inside of the reversed micelle 30, an aqueous solution 32 containing the transition metal salt and the base-metal salt is contained (Step S31). Here, as the transition metal salt and the base-metal salt, nitrate, acetate, chloride, an amine compound, a carbonyl compound, metal alkoxide and the like are useable. Moreover, two or more of these may be mixed.

Figure 5B:
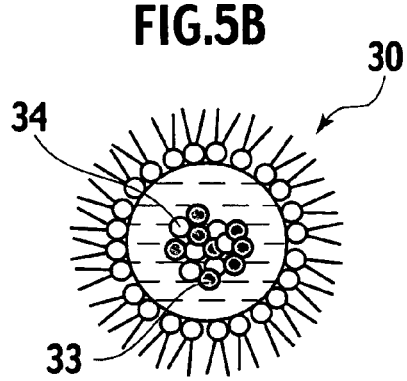
FIG. 5B is a schematic view showing a state where transition metal particles and a hydroxide of base-metal are precipitated substantially simultaneously in the reversed micelle.

Next, into the mixed solution of the organic solvent, which contains the reversed micelles 30, a precipitant of the transition metal and the base-metal is added, and an obtained mixture is agitated (Step S22). Then, as shown in FIG. 5B, the transition metal salt and the base-metal salt are precipitated in the inside of the reversed micelle 30 substantially simultaneously as transition metal particles 33 and base-metal hydroxide 34, respectively. Note that, for example, ammonia, tetramethylammonium hydroxide, hydroxide of alkaline metal (sodium hydroxide and the like), hydrazine, sodium borohydride and the like are usable as the precipitant.

Figure 5C:
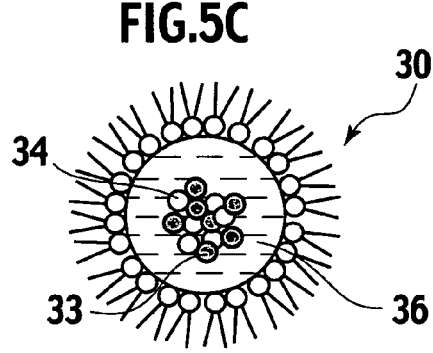
FIG. 5C is a schematic view showing a state where noble metal salt and water are contained in the reversed micelle.

Thereafter, an aqueous solution of the noble metal is mixed into the mixed solution of the organic solvent containing the reversed micelles, and an obtained mixture is agitated (Step S23). Then, as shown in FIG. 5C, the noble metal salt aqueous solution 36 enters into each reversed micelle 30 containing the transition metal hydroxide 33 and the base-metal hydroxide 34. Here, nitrate, chloride, acetate, amine salt and the like are usable as the noble metal salt.

Figure 5D:
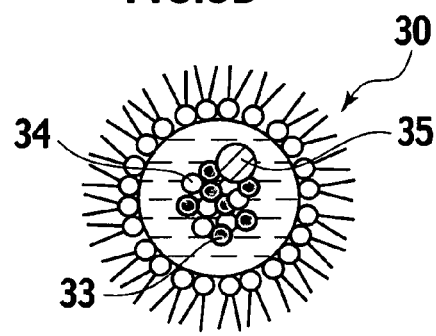
FIG. 5D is a schematic view showing a state where the noble metal particles are precipitated in the reversed micelle.

Next, the reducing agent is mixed into the mixed solution of the organic solvent containing the reversed micelles, and the noble metal salt in the inside of each reversed micelle 30 is reduced, and precipitated singly. By the reduction, as shown in FIG. 5D, the noble metal salt in the inside of the reversed micelle 30 is metalized, and precipitated as a noble metal particle 35 singly (Step S24). Here, hydrazine, sodium borohydride, ammonia and the like are usable as the reducing agent. Moreover, two or more of these may be mixed for use.

Figure 5E:
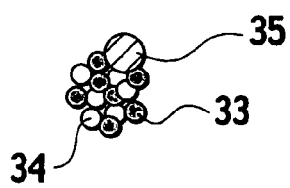
FIG. 5E is a schematic view showing a deposit obtained by decaying the reversed micelle.

Then, alcohol is added into the mixed solution of the organic solvent containing the reversed micelles, an obtained mixture is agitated, and thus, each reversed micelle is decayed (Step S25). By such decay of the reversed micelle, as shown in FIG. 5E, a deposit is obtained, in which the noble metal 35 is in contact with the particle formed by compounding the transition metal particles 33 and the base-metal hydroxide 34. Note that, for example, methanol, ethanol and the like are usable as the alcohol.

Figure 5F:
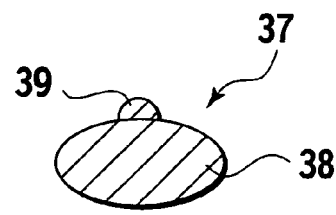
FIG. 5F is a schematic view showing catalyst powder obtained by a reversed micelle method.

Next, the obtained deposit is filtered by a membrane filter, and is then cleaned by use of alcohol and water. Thus, impurities (surfactant and the like) contained in the deposit are removed (Step S26). Moreover, the deposit is dried at 120° C. day and night (Step S27). After being dried, the deposit is baked in airflow at 400° C. for an hour (Step S28). Thus, catalyst powder 37 shown in FIG. 5F can be obtained. In the catalyst powder 37, the deposit is baked, in which the noble metal particle 35 is in contact with the particle formed by compounding the transition metal particles 33 and the base-metal hydroxide 35. Accordingly, water is vaporized in the baking, and a state appears, where a noble metal particle 39 is partially buried in a composite compound 38 of the transition metal and the base-metal. Moreover, owing to the vaporization of the water, the catalyst powder is formed, in which many gaps exist between the particles, the specific surface area is large, and the catalytic activity is high.

Note that, according to the method of producing catalyst powder, baking temperature can be lowered to 400° C., and in addition, a composite compound containing an even spinel compound with an identical particle diameter is obtained.

Moreover, the step of precipitating the noble metal particle in the reversed micelle singly may be performed prior to the step of precipitating the transition metal particle and the base-metal compound in the reversed micelle substantially simultaneously. In this case, the noble metal is first precipitated, thus making it possible to include the noble metal particle in the inside of the particle formed by compounding the transition metal and the base-metal when the reversed micelle is decayed to form the deposit. Then, when the deposit is baked, the composite compound of the transition metal and the base-metal is formed in the periphery of the noble metal particle. Accordingly, the noble metal is evenly dispersed and tightly fixed on the composite compound as the carrier, and the composite compound functions as the anchor for the noble metal. Therefore, the aggregation of the noble metal is restricted, and performance of the catalyst is improved.

Figure 6:
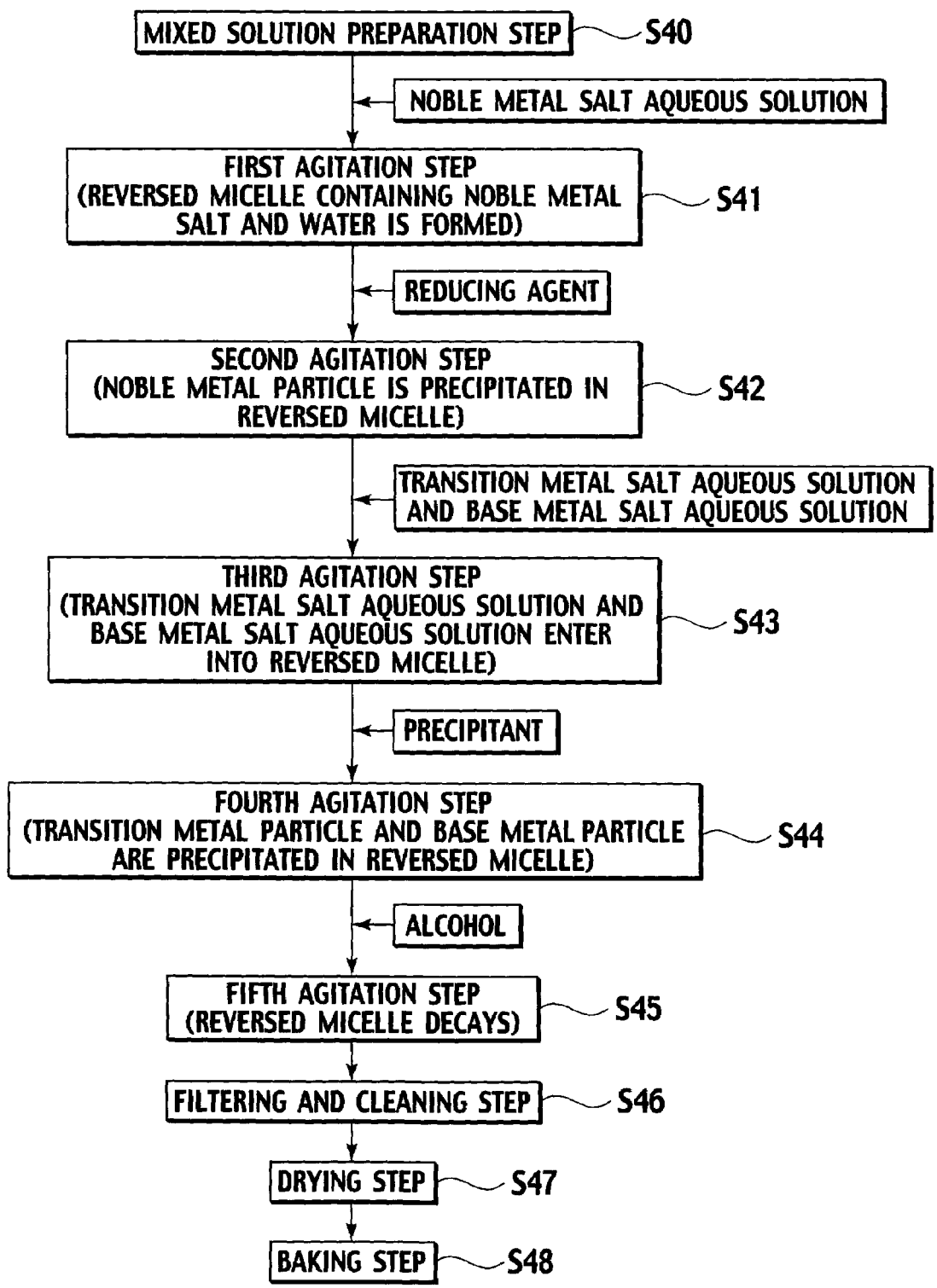
FIG. 6 is a process chart explaining another method of producing the catalyst powder according to the present invention.

FIG. 6 shows a schematic process of a method of producing catalyst powder, in which the step of precipitating the noble metal particle in the reversed micelle singly is performed prior to the step of precipitating the transition metal particle and the base-metal compound in the reversed micelle substantially simultaneously. Here, what is different from the process shown in FIG. 4 is that the mixed solution is first prepared, in which the surfactant is dissolved in the organic solvent (Step S40), the noble metal salt aqueous solution is then added thereto, and thus the noble metal particle is precipitated in the reversed micelle prior to the others.

Figure 7A:
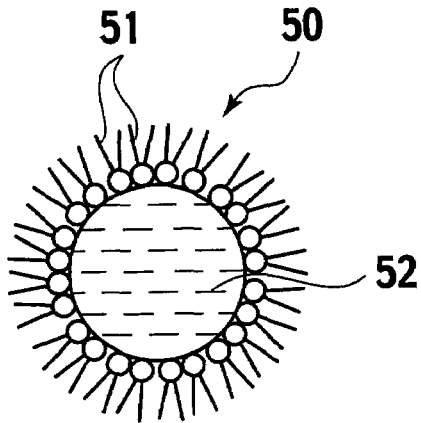
FIG. 7A is a schematic view showing a reversed micelle.

More specific description will be made. The noble metal aqueous solution is first added to the prepared mixed solution, an obtained mixture is agitated, and thus a reversed micelle 50 a shown in FIG. 7A is formed. In the reversed micelle 50, on the periphery of a spherical droplet with a diameter of a little more than ten nanometers, a surfactant 51 is arrayed. In an aqueous phase in the inside of the reversed micelle 50, an aqueous solution 52 containing noble metal salt is contained (Step S41).

Figure 7B:
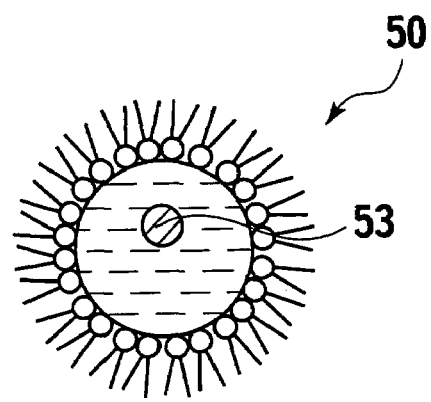
FIG. 7B is a schematic view showing a state where a noble metal particle is precipitated in the reversed micelle.

Next, an aqueous solution of the reducing agent for the noble metal is added to the mixed solution of the organic solvent containing the reversed micelles 50, and an obtained mixture is agitated. Then, as shown in FIG. 7B, the noble metal salt is metalized by the reduction, and precipitated as a noble metal particle 53 singly in the inside of the reversed micelle 50 (Step S42).

Figure 7C:
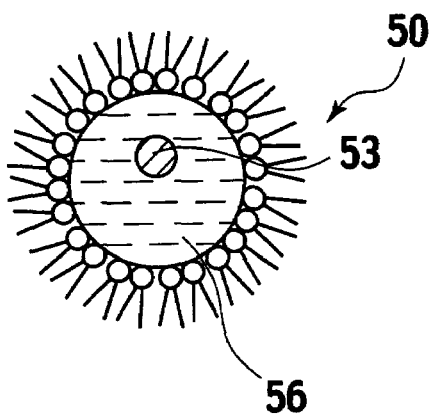
FIG. 7C is a schematic view showing a state where transition metal salt, base-metal salt and water are contained in the reversed micelle.

Subsequently, the mixed aqueous solution of the transition metal salt and the base-metal salt is mixed into the mixed solution of the organic solvent containing the reversed micelles, and an obtained mixture is agitated (Step S43). Then, as shown in FIG. 7C, a mixed solution 56 containing the transition metal salt and the base-metal salt enters into the reversed micelle 50 containing the noble metal particle 53.

Figure 7D:
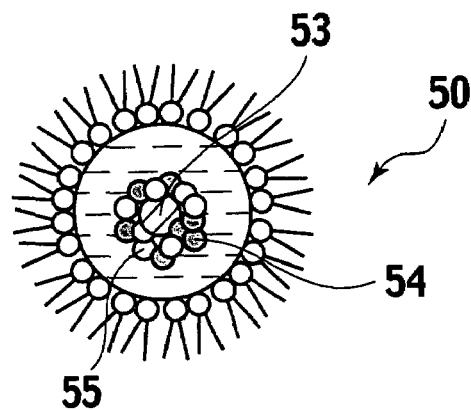
FIG. 7D is a schematic view showing a state where transition metal particles and hydroxide of base-metal are precipitated substantially simultaneously in the reversed micelle.

Next, the precipitant is mixed into the mixed solution of the organic solvent containing the reversed micelle 50, thus precipitating the transition metal salt and the base-metal salt in the reversed micelle 50 substantially simultaneously. Here, as shown in FIG. 7D, the transition metal salt and the base-metal salt are precipitated in the inside of the reversed micelle 50 substantially simultaneously, as transition metal particles 54 and a base-metal hydroxide 55, respectively (Step S44).

Figure 7E:
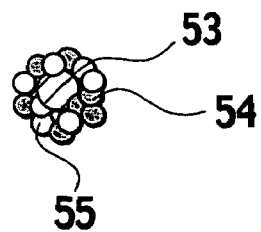
FIG. 7E is a schematic view showing a deposit obtained by decaying the reversed micelle.

Then, alcohol is added into the mixed solution of the organic solvent containing the reversed micelles 50, an obtained mixture is agitated, and thus, each reversed micelle 50 is decayed (Step S45). By such decay of the reversed micelle, as shown in FIG. 7E, a deposit is obtained, in which the noble metal particle 53 is included in the particle formed by compounding the transition metal particles 54 and the base-metal hydroxide 55.

Figure 7F:
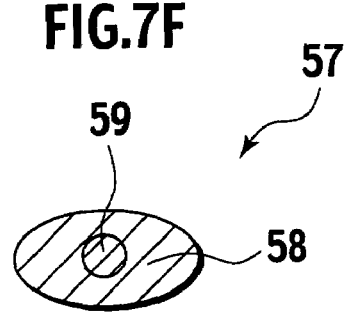
FIG. 7F is a schematic view showing catalyst powder obtained by a reversed micelle method.

Next, the obtained deposit is filtered by a membrane filter, and is then cleaned by use of alcohol and water. Thus, impurities (for example, surfactant and the like) contained in the deposit are removed (Step S46). Moreover, the deposit is dried at 120° C. day and night (Step S47). After being dried, the deposit is baked in airflow at 400° C. for an hour (Step S48). Thus, catalyst powder 57 shown in FIG. 7F can be obtained. In the catalyst powder 57, the deposit is baked, in which the noble metal particle 53 is included in the inside of the particle formed by compounding the transition metal particles 54 and the base-metal hydroxide 55. Accordingly, a state appears, where the noble metal particle 59 is buried in the inside of the composite compound 58. Moreover, water is vaporized, and thus the catalyst powder is formed, in which many gaps exist between the particles, the specific surface area is large, and the catalytic activity is high.

Note that, in both of the production methods, the catalytic activities of the composite compounds differ depending on types of the elements thereof, conditions where each catalyst is used, and the like. Accordingly, in order to obtain desired catalytic activity, the types of the elements, the reducing agent and the precipitant for use, reaction temperatures, reaction times, agitation strengths, agitation methods and the like may be changed as appropriate.

Moreover, according to needs, at least one or more elements selected from the group consisting of Ce, Nd, Pr, La, Zr, Ba and Mg may be added. In the case of adding these elements to the catalyst powder, the phase transition of the composite compound as the carrier is restricted to improve the heat resistance, thus making it possible to restrict the aggregation of the noble metal. Note that, with regard to a method for adding these elements to the catalyst powder, a method of precipitating the above-described elements when preparing the reversed micelles in a similar way to the noble metal, the transition metal and the like may also be used in addition to a method of adding the above-described elements by impregnation after producing the catalyst powder.

(Exhaust Gas Purifying Catalyst)

Next, an embodiment of the exhaust gas purifying catalyst according to the present invention will be described. The exhaust gas purifying catalyst according to this embodiment is characterized in that a catalyst layer containing the above-described catalyst powder is provided on a honeycomb substrate. Note that, in the exhaust gas purifying catalyst of the present invention, it is preferable that the amount of noble metal be 0.7 g or less per 1 L of the exhaust gas purifying catalyst. Heretofore, when the noble metal is singly 0.7 g or less per 1 L of the exhaust gas purifying catalyst, sufficient catalytic activity has not been obtained. However, the catalyst powder of the invention of this application exerts the anchor effect and the effect of supplementing the catalytic activity of the noble metal by the composite compound. Accordingly, the sufficient catalytic activity can be obtained even if the amount of noble metal usage in the exhaust gas purifying catalyst is decreased.

More specific description will be made for the exhaust gas purifying catalyst according to the present invention by use of Examples 1 to 3, Comparative examples 1 to 3 and Reference example. However, the scope of the present invention is not limited to these Examples. These Examples are ones in which effectiveness of the exhaust gas purifying catalyst according to the present invention is investigated, and show examples of an exhaust gas purifying catalyst, which are prepared by use of different materials.

Preparation of Samples

Example 1

In Example 1, the transition metal and the base-metal were first precipitated in the reversed micelle substantially simultaneously, and the noble metal was then precipitated in the reversed micelle singly (method of FIG. 4).

1. Preparation of Powder of Pt (0.3% by Weight)-Co—$Al_2O_3$

5 L of cyclohexane was used as the organic solvent, 330 g of polyethylene glycol-p-nonylphenyl ether (NP-5) was used as the surfactant, and both were mixed together to prepare a mixed solution (Step S20). Here, a ratio of the surfactant and the organic solvent (surfactant/organic solvent [mol/L]) is 0.15.

Next, into the prepared mixed solution, a mixed aqueous solution of 14.5 g of cobalt nitrate hexahydrate as a starting material of the transition metal, 36.7 g of aluminum nitrate nonahydrate as a starting material of the base-metal and 50 mL of water was added. An obtained mixture was agitated for two hours, and thus a mixed solution containing cobalt ions and aluminum ions in the reversed micelles was prepared (Step S21). Here, a molar ratio of the water and the surfactant (water/surfactant) is 5.3.

Next, 131.3 g of a 15% aqueous solution of tetramethylammonium hydroxide was added as a precipitant into the mixed solution. An obtained mixture was agitated for another two hours, and thus cobalt particles and an aluminum hydroxide were precipitated in the reversed micelles (Step S22).

Moreover, a mixed solution of 0.3070 g of a 8.5% aqueous solution of dinitrodiamine platinum as a starting material of the noble metal and 13.2 mL of pure water was added to the mixed solution of the organic solvent. An obtained mixture was agitated for another two hours, and thus a mixed solution containing platinum ions in the reversed micelles was prepared (Step S23). After the agitation, 0.0152 g of sodium borohydride ($NaBH_4$) was added as a reducing agent of the platinum. An obtained mixture was agitated for another two hours, and thus the platinum ions in the reversed micelles were reduced and metalized (Step S24).

Next, 500 mL of methanol was added to the mixed solution, and an obtained mixture was then agitated for an hour to decay the reversed micelles (Step S25). Thereafter, the mixture was left day and night, and thus was separated into a deposit layer and a solvent layer. Subsequently, the mixed solution was filtered by suction filtration, and a deposit obtained by the filtration was added into ethanol. Thus, the surfactant was removed. Then, the deposit thus obtained was filtered, pure water was added thereto, and the filtration was performed again therefor. Thus, impurities such as sodium were removed (Step S26). Next, a filtered substance thus obtained was dried at 120° C. for a night (Step S27) and was milled. Then, a milled substance was baked at 400° C. for an hour in an oxygen atmosphere, and thus powder was obtained (Step S28).

Next, cerium acetate, lanthanum acetate and zirconium acetate were impregnated into the powder obtained by the above-described preparation so as to be 8.5% by weight, 5.5% by weight and 6% by weight in oxide conversion, respectively. An obtained mixture was dried at 120° C. day and night, and was baked at 400° C. for an hour. A series of these steps was repeated ten times, and thus 63 g of catalyst powder was obtained (yield was 73%).

2. Coating on Honeycomb Substrate 50 g of the catalyst powder thus obtained, 5 g of boehmite and 157 g of a 10% nitric acid aqueous solution were put into an alumina-made magnetic pot, and shaken and milled together with alumina balls, and thus slurry was obtained. Next, the obtained slurry was adhered onto 0.0595 L of a cordierite-made honeycomb substrate (400 cell/6 mil), and excessive slurry on the cells was removed by airflow.

Next, the remaining slurry was dried at 120° C., and then baked at 400° C. for an hour in airflow, and thus a catalyst layer was formed. An amount of the catalyst layer coated on the substrate was 110 g per 1 L of the catalyst, and an amount of the platinum contained per 1 L of the catalyst was 0.3 g.

Example 2

In Example 2, the noble metal was first precipitated in the reversed micelles singly, and the transition metal and the base-metal were then precipitated in the reversed micelles simultaneously (method of FIG. 6).

1. Preparation of Powder of Pt (0.3% by Weight)-Co—$Al_2O_3$

5 L of cyclohexane was used as the organic solvent, 330 g of NP-5 was used as the surfactant, and both were mixed together to prepare a mixed solution (Step S40). Here, a ratio of the surfactant and the organic solvent (surfactant/organic solvent [mol/L]) is 0.15.

Next, a mixed solution of 0.3070 g of a 8.5% aqueous solution of dinitrodiamine platinum as a starting material of the noble metal and 13.2 mL of pure water was added to the mixed solution thus prepared. An obtained mixture was agitated for two hours, and thus a mixed solution containing platinum ions in the reversed micelles was prepared (Step S41).

Thereafter, 0.0152 g of $NaBH_4$ was added as a reducing agent of the platinum. An obtained mixture was agitated for another two hours, and thus the platinum ions in the reversed micelles were reduced and metalized (Step S42).

Moreover, into the mixed solution thus prepared, a mixed aqueous solution of 14.5 g of cobalt nitrate hexahydrate as a starting material of the transition metal, 36.7 g of aluminum nitrate nonahydrate as a starting material of the base-metal and 50 mL of water was added. An obtained mixture was agitated for two hours, and thus a mixed solution containing cobalt ions and aluminum ions in the reversed micelles was prepared (Step S43). Here, a molar ratio of the water and the surfactant (water/surfactant) is 5.3.

After agitation, 131.3 g of a 15% aqueous solution of tetramethylammonium hydroxide was added as a precipitant into the mixed solution. An obtained mixture was agitated for another two hours, and thus cobalt particles and an aluminum hydroxide were precipitated in the reversed micelles (Step S44).

Next, 500 mL of methanol was added to the mixed solution, and an obtained mixture was then agitated for an hour to decay the reversed micelles (Step S45). Thereafter, the mixture was left day and night, and thus was separated into a deposit layer and a solvent layer. Subsequently, the mixed solution was filtered by suction filtration, and a deposit obtained by the filtration was added into ethanol. Thus, the surfactant was removed. Then, the deposit thus obtained was filtered, pure water was added thereto, and the filtration was performed again therefor. Thus, impurities such as sodium were removed (Step S46). Next, a filtered substance thus obtained was dried at 120° C. for a night (Step S47) and was milled. Then, a milled substance was baked at 400° C. for an hour in an oxygen atmosphere, and thus powder was obtained (Step S48).

Next, cerium acetate, lanthanum acetate and zirconium acetate were impregnated into the powder obtained by the above-described preparation so as to be 8.5% by weight, 5.5% by weight and 6% by weight in oxide conversion, respectively. An obtained mixture was dried at 120° C. day and night, and was baked at 400° C. for an hour. A series of these steps was repeated ten times, and thus 66 g of catalyst powder was obtained (yield was 76%).

2. Coating on Honeycomb Substrate 50 g of the catalyst powder thus obtained, 5 g of boehmite and 157 g of a 10% nitric acid aqueous solution were put into an alumina-made magnetic pot, and shaken and milled together with alumina balls, and thus slurry was obtained. Next, the obtained slurry was adhered onto 0.0595 L of a cordierite-made honeycomb substrate (400 cell/6 mil), and excessive slurry on the cells was removed by airflow.

Next, the remaining slurry was dried at 120° C., and then baked at 400° C. for an hour in airflow, and thus a catalyst layer was formed. An amount of the catalyst layer coated on the substrate was 110 g per 1 L of the catalyst, and an amount of the platinum contained per 1 L of the catalyst was 0.3 g.

Example 3

In a similar way to Example 1, in Example 3, the transition metal and the base-metal were first precipitated in the reversed micelle substantially simultaneously, and the noble metal was then precipitated in the reversed micelle singly (method of FIG. 4). Note that what is different from Example 1 is that the amount of carried platinum is larger.

1. Preparation of Powder of Pt (0.7% by Weight)-Co—$Al_2O_3$

5 L of cyclohexane was used as the organic solvent, 330 g of polyethylene glycol-p-nonylphenyl ether (NP-5) was used as the surfactant, and both were mixed together to prepare a mixed solution (Step S20). Here, a ratio of the surfactant and the organic solvent (surfactant/organic solvent [mol/L]) is 0.15.

Next, into the prepared mixed solution, a mixed aqueous solution of 14.5 g of cobalt nitrate hexahydrate as a starting material of the transition metal, 36.7 g of aluminum nitrate nonahydrate as a starting material of the base-metal and 50 mL of water was added. An obtained mixture was agitated for two hours, and thus a mixed solution of the organic solvent, which contained cobalt ions and aluminum ions in the reversed micelles, was prepared (Step S21). Here, a molar ratio of the water and the surfactant (water/surfactant) is 5.3.

Next, 131.3 g of a 15% aqueous solution of tetramethylammonium hydroxide was added as a precipitant into the mixed solution. An obtained mixture was agitated for another two hours, and thus cobalt particles and an aluminum hydroxide were precipitated in the reversed micelles (Step S22).

Moreover, a mixed solution of 0.7193 g of a 8.5% aqueous solution of dinitrodiamine platinum as a starting material of the noble metal and 12.8 mL of pure water was added to the mixed solution of the organic solvent. An obtained mixture was agitated for another two hours, and thus a mixed solution containing platinum ions in the reversed micelles was prepared (Step S23). After the agitation, 0.0356 g of sodium borohydride ($NaBH_4$) was added as a reducing agent of the platinum ions. An obtained mixture was agitated for another two hours, and thus the platinum ions in the reversed micelles were reduced and metalized (Step S24).

Next, 500 mL of methanol was added to the mixed solution, and an obtained mixture was then agitated for an hour to decay the reversed micelles (Step S25). Thereafter, the mixture was left day and night, and thus was separated into a deposit layer and a solvent layer. Subsequently, the mixed solution was filtered by suction filtration, and a deposit obtained by the filtration was added into ethanol. Thus, the surfactant was removed. Then, the deposit thus obtained was filtered, pure water was added thereto, and the filtration was performed again therefor. Thus, impurities such as sodium were removed (Step S26). Next, a filtered substance thus obtained was dried at 120° C. for a night (Step S27) and was milled. Then, a milled substance was baked at 400° C. for an hour in an oxygen atmosphere, and thus powder was obtained (Step S28).

Next, cerium acetate, lanthanum acetate and zirconium acetate were impregnated into the powder obtained by the above-described preparation so as to be 8.5% by weight, 5.5% by weight and 6% by weight in oxide conversion, respectively. An obtained mixture was dried at 120° C. day and night, and was baked at 400° C. for an hour. A series of these steps was repeated ten times, and thus 63 g of catalyst powder was obtained (yield was 73%).

2. Coating on Honeycomb Substrate 50 g of the catalyst powder thus obtained, 5 g of boehmite and 157 g of a 10% nitric acid aqueous solution were put into an alumina-made magnetic pot, and shaken and milled together with alumina balls, and thus slurry was obtained. Next, the obtained slurry was adhered onto 0.0595 L of a cordierite-made honeycomb substrate (400 cell/6 mil), and excessive slurry on the cells was removed by airflow.

Next, the remaining slurry was dried at 120° C., and then baked at 400° C. for an hour in airflow, and thus a catalyst layer was formed. An amount of the catalyst layer coated on the substrate was 110 g per 1 L of the catalyst, and an amount of the platinum contained per 1 L of the catalyst was 0.7 g.

Comparative Example 1

In Comparative example 1, catalyst powder was produced by use of an impregnation method.

1. Preparation of Powder of Pt (0.3% by Weight)-Co—$Al_2O_3$

First, a mixed solution of 287.3 g of cobalt nitrate nonahydrate and pure water was impregnated into 100 g of alumina with a specific surface area of 200 $m^2/g$, followed by drying at 120° C. day and night and baking at 400° C. for an hour. Thus, powder was obtained. Into the obtained powder, an aqueous solution of dinitrodiamine platinum was impregnated such that a concentration of the carried platinum was 0.3% by weight, followed by drying at 120° C. day and night and baking at 400° C. for an hour. Thus, powder was obtained. Into the obtained powder, cerium acetate, lanthanum acetate and zirconium acetate were impregnated so as to be 8.5% by weight, 5.5% by weight and 6% by weight in oxide conversion, respectively. Thereafter, an obtained mixture was dried at 120° C. day and night, and baked at 400° C. for an hour. Powder thus obtained was referred to as catalyst powder.

2. Coating on Honeycomb Substrate 50 g of the catalyst powder thus obtained, 5 g of boehmite and 157 g of a 10% nitric acid aqueous solution were put into an alumina-made magnetic pot, and shaken and milled together with alumina balls, and thus slurry was obtained. Next, the obtained slurry was adhered onto 0.0595 L of a cordierite-made honeycomb substrate (400 cell/6 mil), and excessive slurry on the cells was removed by airflow.

Next, the remaining slurry was dried at 120° C., and then baked at 400° C. for an hour in airflow. At this time, an amount of the catalyst layer coated on the substrate was 47 g per 1 L of the catalyst, and an amount of the platinum contained per 1 L of the catalyst was 0.3 g.

Comparative Example 2

In Comparative example 2, catalyst powder was produced by use of the impregnation method. Note that what is different from Comparative example 1 is that the amount of carried platinum is larger.

1. Preparation of Powder of Pt (0.7% by Weight)-Co—$Al_2O_3$

First, a mixed solution of 287.3 g of cobalt nitrate nonahydrate and pure water was impregnated into 100 g of alumina with a specific surface area of 200 $m^2/g$, followed by drying at 120° C. day and night and baking at 400° C. for an hour. Thus, powder was obtained. Into the obtained powder, an aqueous solution of dinitrodiamine platinum was impregnated such that a concentration of the carried platinum was 0.7% by weight, followed by drying at 120° C. day and night and baking at 400° C. for an hour. Thus, powder was obtained. Into the obtained powder, cerium acetate, lanthanum acetate and zirconium acetate were impregnated so as to be 8.5% by weight, 5.5% by weight and 6% by weight in oxide conversion, respectively. Thereafter, an obtained mixture was dried at 120° C. day and night, and baked at 400° C. for an hour. Powder thus obtained was referred to as catalyst powder.

2. Coating on Honeycomb Substrate 50 g of the catalyst powder thus obtained, 5 g of boehmite and 157 g of a 10% nitric acid aqueous solution were put into an alumina-made magnetic pot, and shaken and milled together with alumina balls, and thus slurry was obtained. Next, the obtained slurry was adhered onto 0.0595 L of a cordierite-made honeycomb substrate (400 cell/6 mil), and excessive slurry on the cells was removed by airflow.

Next, the remaining slurry was dried at 120° C., and then baked at 400° C. for an hour in airflow. At this time, an amount of the catalyst layer coated on the substrate was 47 g per 1 L of the catalyst, and an amount of the platinum contained per 1 L of the catalyst was 0.7 g.

Comparative Example 3

In Comparative example 3, catalyst powder was produced by use of the impregnation method. Note that what is different from Comparative examples 1 and 2 is that the amount of carried platinum is larger.

1. Preparation of Powder of Pt (1.4% by Weight)-Co—$Al_2O_3$

First, a mixed solution of 287.3 g of cobalt nitrate nonahydrate and pure water was impregnated into 100 g of alumina with a specific surface area of 200 $m^2$/g, followed by drying at 120° C. day and night and baking at 400° C. for an hour. Thus, powder was obtained. Into the obtained powder, an aqueous solution of dinitrodiamine platinum was impregnated such that a concentration of the carried platinum was 1.4% by weight, followed by drying at 120° C. day and night and baking at 400° C. for an hour. Thus, powder was obtained. Into the obtained powder, cerium acetate, lanthanum acetate and zirconium acetate were impregnated so as to be 8.5% by weight, 5.5% by weight and 6% by weight in oxide conversion, respectively. Thereafter, an obtained mixture was dried at 120° C. day and night, and baked at 400° C. for an hour. Powder thus obtained was referred to as catalyst powder.

2. Coating on Honeycomb Substrate 50 g of the catalyst powder thus obtained, 5 g of boehmite and 157 g of a 10% nitric acid aqueous solution were put into an alumina-made magnetic pot, and shaken and milled together with alumina balls, and thus slurry was obtained. Next, the obtained slurry was adhered onto 0.0595 L of a cordierite-made honeycomb substrate (400 cell/6 mil), and excessive slurry on the cells was removed by airflow.

Next, the remaining slurry was dried at 120° C., and then baked at 400° C. for an hour in airflow. At this time, an amount of the catalyst layer coated on the substrate was 47 g per 1 L of the catalyst, and an amount of the platinum contained per 1 L of the catalyst was 1.4 g.

Reference Example

As a reference example, an example of producing catalyst powder by use of the reversed micelle method such that a concentration of the carried noble metal becomes 1.4% by weight is shown. Here, the transition metal and the base-metal were first precipitated in the reversed micelle substantially simultaneously, and the noble metal was then precipitated in the reversed micelle singly (method of FIG. 4).

1. Preparation of Powder of Pt (1.4% by Weight)-Co—$Al_2O_3$

5 L of cyclohexane was used as the organic solvent, 330 g of polyethylene glycol-p-nonylphenyl ether was used as the surfactant, and both were mixed together to prepare a mixed solution (Step S20). Here, a ratio of the surfactant and the organic solvent (surfactant/organic solvent [mol/L]) is 0.15.

Next, into the prepared mixed solution, a mixed aqueous solution of 14.5 g of cobalt nitrate hexahydrate as a starting material of the transition metal, 36.7 g of aluminum nitrate nonahydrate as a starting material of the base-metal and 50 mL of water was added. An obtained mixture was agitated for two hours, and thus a mixed solution of the organic solvent, which contained cobalt ions and aluminum ions in the reversed micelles, was prepared (Step S21). Here, a molar ratio of the water and the surfactant (water/surfactant) is 5.3.

Next, 131.3 g of a 15% aqueous solution of tetramethylammonium hydroxide was added as a precipitant into the mixed solution. An obtained mixture was agitated for another two hours, and thus cobalt particles and an aluminum hydroxide were precipitated in the reversed micelles (Step S22).

Moreover, a mixed solution of 1.4488 g of a 8.5% aqueous solution of dinitrodiamine platinum as a starting material of the noble metal and 12.1 mL of pure water was added to the mixed solution of the organic solvent. An obtained mixture was agitated for another two hours, and thus a mixed solution of the organic solvent, which contained platinum ions in the reversed micelles, was prepared (Step S23). After the agitation, 0.0716 g of $NaBH_4$ was added as a reducing agent of the platinum ions. An obtained mixture was agitated for another two hours, and thus the platinum ions in the reversed micelles were reduced and metalized (Step S24).

Next, 500 mL of methanol was added to the mixed solution, and an obtained mixture was then agitated for an hour to decay the reversed micelles (Step S25). Thereafter, the mixture was left day and night, and thus was separated into a deposit layer and a solvent layer. Subsequently, the mixed solution was filtered by suction filtration, and a deposit obtained by the filtration was added into ethanol. Thus, the surfactant was removed. Then, the deposit thus obtained was filtered, pure water was added thereto, and the filtration was performed again therefor. Thus, impurities such as sodium were removed (Step S26). Next, a filtered substance thus obtained was dried at 120° C. for a night (Step S27) and was milled. Then, a milled substance was baked at 400° C. for an hour in an oxygen atmosphere, and thus powder was obtained (Step S28).

Next, cerium acetate, lanthanum acetate and zirconium acetate were impregnated into the powder obtained by the above-described preparation so as to be 8.5% by weight, 5.5% by weight and 6% by weight in oxide conversion, respectively. An obtained mixture was dried at 120° C. day and night, and was baked at 400° C. for an hour. A series of these steps was repeated ten times, and thus 63 g of catalyst powder was obtained (yield was 73%).

2. Coating on Honeycomb Substrate 50 g of the catalyst powder thus obtained, 5 g of boehmite and 157 g of a 10% nitric acid aqueous solution were put into an alumina-made magnetic pot, and shaken and milled together with alumina balls, and thus slurry was obtained. Next, the obtained slurry was adhered onto 0.0595 L of a cordierite-made honeycomb substrate (400 cell/6 mil), and excessive slurry on the cells was removed by airflow.

Next, the remaining slurry was dried at 120° C., and then baked at 400° C. for an hour in airflow, and thus a catalyst layer was formed. An amount of the catalyst layer coated on the substrate was 110 g per 1 L of the catalyst, and an amount of the platinum contained per 1 L of the catalyst was 1.4 g.

Here, samples obtained by the above-described preparations were evaluated by the following methods.

(Heat Resistance Test)

A heat resistance test was performed by baking the obtained catalysts at 700° C. for an hour in an oxygen atmosphere.

(Measurement of Purification Rate)

Each catalyst subjected to the above-described heat resistance test was partially cut away to set a volume thereof at 40 mL, and the catalyst thus cut away was evaluated. A purification rate of each catalyst was measured under conditions where a flow rate of reaction gas was 40 L/min., a reaction gas temperature was 350° C., and a composition of the reaction gas was set stoichiometric as shown in the following Table 1.

TABLE 1

| Composition | Concentration |
|---|---|
| NO | 1000 ppm |
| CO | 0.60% |
| $H_2$ | 0.20% |
| $O_2$ | 0.60% |
| $CO_2$ | 13.9% |
| HC | 1665 ppmC |
| $H_2O$ | 10% |
| $N_2$ | Rest |

(Measurement Method of Degree of Dispersion of Noble Metal)

For measuring the degree of dispersion of the noble metal, a rare metal dispersion rate measurement BEL-METAL-3 made by Bel Japan, Inc. was used. The measurement was performed according to the following procedure. Each sample was heated up to 400° C. at the rate of 10° C./min. in a gas flow of 100% He, and next, was subjected to an oxidation treatment at 400° C. for 15 minutes in a gas flow of 100% $O_2$. Then, the filled gas was purged by a gas of 100% He for 5 minutes, and the sample was subjected to a reduction treatment at 400° C. for 15 minutes in a flow of a balance gas of 40% $H_2$/He. Next, the sample was cooled down to 50° C. in a gas flow of 100% He. Then, in a way of outputting pulses, a balance gas of 10% CO/He was flown in. From an amount of CO adsorption, the degree of dispersion of the noble metal was obtained in accordance with the following expression.

$$\text{Degree of dispersion (\%)} = \frac{100 \times \text{Atomic weight of carried metal} \times \text{Absorption amount per unit}}{22414 \times \text{Stoichiometric ratio} \times \text{Content of carried metal}} \quad \text{(Expression 1)}$$

Note that the adsorption amount per unit was obtained by the following Expression 2.

$$\text{Adsorption amount (cm}^3\text{/g)} = \frac{\text{Total adsorption amount}}{\text{Sample weight}} \quad \text{(Expression 2)}$$

(Measurement of Particle Diameter of Noble Metal)

A catalyst layer of each exhaust gas purifying catalyst obtained by preparing each sample described above was scraped off, and the evaluation was implemented therefor by means of a TEM-EDX measurement. Measurements were performed by use of HF-2000 made by Hitachi, Ltd. with an acceleration voltage of 200 kV. With regard to a measurement method, the catalyst was packed by epoxy resin, and after the epoxy resin was cured, an extremely thin slice was prepared by ultramicrotome. Dispersion states of various crystalline particles in this slice were observed by means of a transmission electron microscope (TEM). Contrast portions were focused in an obtained image, a type of the metal was defined, and a particle diameter of the metal was measured.

(Measurement of Crystallite Diameter)

An X-ray diffraction measurement was performed for each sample obtained by the above-described preparation. As for an X-ray diffraction apparatus, an X-ray diffraction apparatus MXP18VAHF made by Bruker AXS was used. Prior to the measurement, the sample was baked at 400° C. for an hour in the air. Thereafter, the sample was fixed to a sample folder for the X-ray diffraction measurement, and the measurement was performed. Note that the measurement was performed by a conventional method under conditions where a radiation source was Cu, a tube voltage was 40.0 kV, a tube current was 300.0 mA, a data range was 5 to 90 deg., a sampling interval was 0.020 deg., a scan speed was 4.000 deg./min., a divergence slit (DS) was 1.00 deg., a scattering slit (SS) was 1.00 deg., and a receiving slit (RS) was 0.30 deg. By the Scherrer formula, a crystallite diameter (nm) was calculated based on an observed half width ($2\theta$) of a (111) diffraction line of an X-ray diffraction pattern obtained by the measurement.

The amounts of platinum (g/L) contained per 1 L of the catalyst, the particle diameters thereof (nm), the degrees of dispersion thereof, and NOx purification rates after the heat resistance tests in the above-described Examples 1 to 3, Comparative examples 1 to 3 and reference example are shown in the following Table 2.

TABLE 2

| | Preparation method | Amount of platinum (g/L) | Particle diameter of platinum (nm) | Degree of dispersion of platinum (%) | Purification rate (%) |
|---|---|---|---|---|---|
| Example 1 | Reversed micelle method | 0.3 | 4.6 | 59 | 72 |
| Example 2 | Reversed micelle method | 0.3 | 5.2 | 53 | 68 |
| Example 3 | Reversed micelle method | 0.7 | 5.4 | 51 | 85 |
| Comparative example 1 | Impregnation method | 0.3 | 1 or less | 76 | 43 |

TABLE 2-continued

|  | Preparation method | Amount of platinum (g/L) | Particle diameter of platinum (nm) | Degree of dispersion of platinum (%) | Purification rate (%) |
|---|---|---|---|---|---|
| Comparative example 2 | Impregnation method | 0.7 | 1 or less | 73 | 73 |
| Comparative example 3 | Impregnation method | 1.4 | 1 or less | 65 | 93 |
| Reference example | Reversed micelle method | 1.4 | 6.1 | 44 | 95 |

Based on results obtained by the TEM-EDX measurement, the particle diameter of platinum of the powder obtained by Example 1 was 4.6 nm, the particle diameter of platinum of the powder obtained by Example 2 was 5.2 nm, and the particle diameter of platinum of the powder obtained by Example 3 was 5.4 nm. Moreover, the particle diameters of platinum of the powders obtained by Comparative examples 1 to 3 were 1 nm or less (a measurement limit value or less). Note that the particle diameter of platinum of the powder obtained by Reference example was 6.1 nm. As described above, in the case of producing the catalyst powder by the reversed micelle method, the catalyst powder with a larger particle diameter of platinum than in the case of producing the catalyst powder by the impregnation method was obtained.

Moreover, the degree of dispersion of the powder obtained by Example 1 was 59%, the degree of dispersion of the powder obtained by Example 2 was 53%, and the degree of dispersion of the powder obtained by Example 3 was 51%. Furthermore, the degree of dispersion of the powder obtained by Comparative example 1 was 76%, the degree of dispersion of the powder obtained by Comparative example 2 was 73%, and the degree of dispersion of the powder obtained by Comparative example 3 was 65%. Note that the degree of dispersion of the powder obtained by Reference example was 44%. As described above, in the case of producing the catalyst powder by the reversed micelle method, the degree of dispersion of platinum was lower in an initial period of the production of the catalyst powder than in the case of producing the catalyst powder by the impregnation method.

Figure 8:
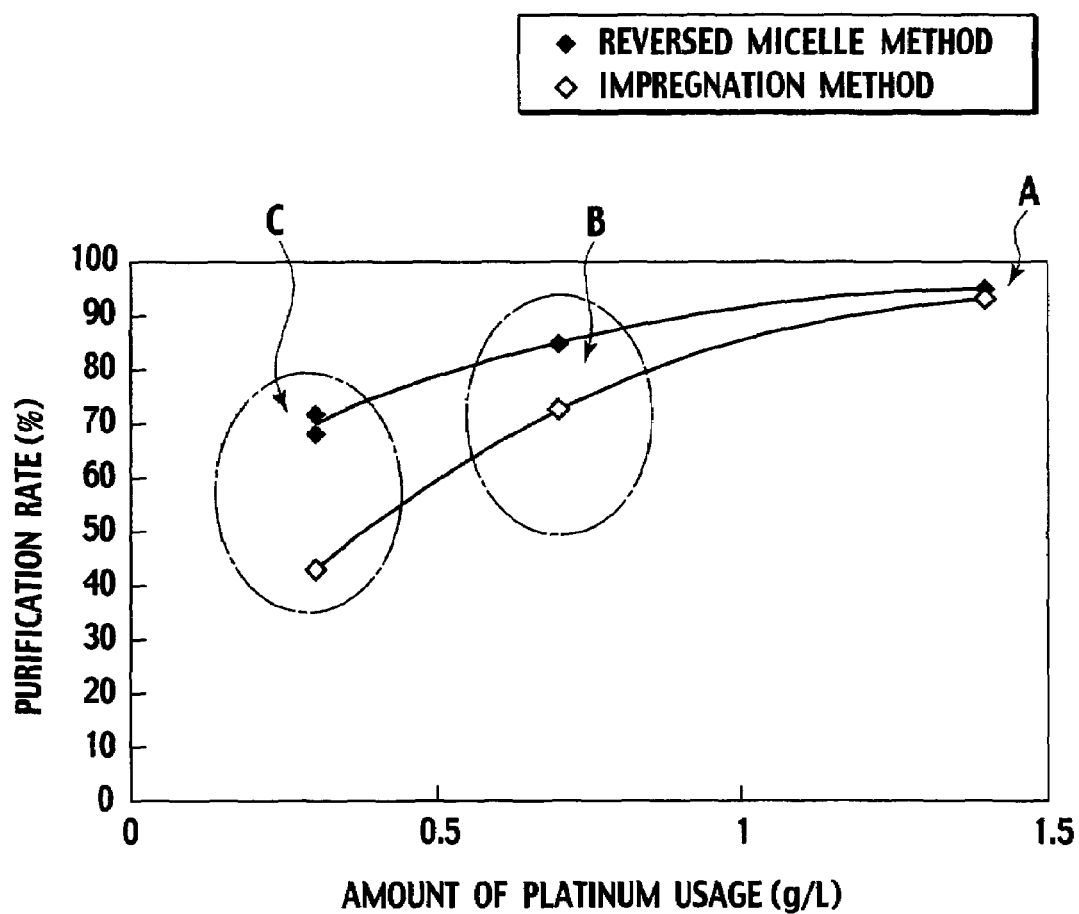
FIG. 8 is a graph showing relationships between amounts of platinum usages and purification rates.

Furthermore, the purification rate of the powder obtained by Example 1 was 72%, the purification rate of the powder obtained by Example 2 was 68%, and the purification rate of the powder obtained by Example 3 was 85%. Moreover, the purification rate of the powder obtained by Comparative example 1 was 43%, the purification rate of the powder obtained by Comparative example 2 was 73%, and the purification rate of the powder obtained by Comparative example 3 was 93%. Note that the purification rate of the powder obtained by Reference example was 95%. FIG. 8 shows relationships between the amounts of platinum usages (g/L) and the purification rates (%) in the catalyst powder obtained by the reversed micelle method and the catalyst powder obtained by the impregnation method.

Reference symbol A of FIG. 8 denotes the purification rates (%) when the amounts of platinum usages are 1.4 g/L. When seeing the reference symbol A of FIG. 8, values of the purification rates hardly differ between the case of producing the catalyst powder by the reversed micelle method and the case of producing the catalyst powder by the impregnation method, and a great effect by producing the catalyst powder by the reversed micelle method is not seen. Moreover, reference symbol B denotes values of Example 3 and Comparative example 2, in both of which the amounts of platinum usages are 0.7 g/L. When comparing the values of the reference symbol B of FIG. 8 with each other, a higher purification rate is obtained in Example 3 in which the catalyst powder is produced by the reversed micelle method.

Reference symbol C of FIG. 8 denotes the purification rates (%) in Example 1, Example 2 and Comparative example 1, in all of which the amounts of platinum usages are 0.3 g/L. When seeing the reference symbol C of FIG. 8, in Example 1 and Example 2, in both of which the catalyst powders are produced by the reversed micelle method, substantially similar purification rates are obtained though orders of the noble metal, the transition metal and the base-metal differ therebetween. Moreover, when comparing values of Examples 1 and 2 with values of Comparative example 1, the degrees of dispersion of the catalyst powders obtained by Example 1 and Example 2 are lower than that of Comparative example 1. However, the catalyst powders obtained by Example 1 and Example 2 exert high purification rates.

As described above, it is understood that, when the amount of platinum usage is 0.7 g/L or less, a great effect by producing the catalyst powder by the reversed micelle method is obtained, and the catalyst powder excellent in heat resistance is obtained. However, as shown in Reference example, even if the catalyst powders are produced by the reversed micelle method, when the amounts of platinum usages are large, no large difference is seen between the case of producing the catalyst powder by the reversed micelle method and the case of producing the catalyst powder by the impregnation method.

Next, FIG. 9 shows X-ray diffraction patterns of XRD in Example 1 and Comparative example 1. Moreover, the following Table 3 shows the half widths (2θ) of the (111) diffraction lines of cobalt aluminate contained in the samples obtained by Example 1 and Comparative example 1 and the crystallite diameters (nm) calculated by the Scherrer formula.

TABLE 3

|  | Preparation method | Half width (2θ) | Crystallite diameter (nm) |
|---|---|---|---|
| Example 1 | Reversed micelle method | 19.06 | 5.6 |
| Comparative example 1 | Impregnation method | 9.02 | 7.2 |

In FIG. 9, the (111) diffraction lines indicating the presence of cobalt aluminate as the spinel compound are observed in both of Example 1 and Comparative example 1. When comparing values of the half widths (2θ) of the respective (111) diffraction lines with each other, the value in Comparative example 1 is as small as 9.02 while the value in Example 1 is 19.06. Moreover, with regard to values of the crystallite diameters, the value in Example 1 is 5.6 nm, which is smaller than that of Comparative example 1. Thus, it is conceived that an array of the crystals is random in Example 1. As described above, in Example 1, the crystallite diameter is small, and the crystals themselves are random. Therefore, it is conceived that, in Example 1, the crystals are difficult to move as compared with the case where the crystal array is aligned, thereby restricting the phase transition.

From the above results, it is understood that the catalyst powder excellent in heat resistance can be obtained in the case of producing the catalyst powder by the reversed micelle method in the range where the amount of noble metal is as small as 0.7 g/L or less.

The entire content of a Japanese Patent Application No. P2004-085350 with a filing date of Mar. 23, 2004 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. Catalyst powder, comprising:
   a composite compound containing transition metal and base-metal; and
   a noble metal particle which is in contact with the composite compound, wherein the noble metal particle has a particle diameter of 1 nm to 10 nm and is at least partially buried in the composite compound.

2. The catalyst powder according to claim 1, wherein a degree of dispersion of noble metal carried on the composite compound is 50% or more.

3. The catalyst powder according to claim 1, wherein the noble metal particle comprises at least one metal selected from the group consisting of platinum, palladium, rhodium, iridium, ruthenium and gold,
   wherein the transition metal is at least one selected from the group consisting of iron, cobalt, nickel, manganese, copper and zinc, and
   wherein the base-metal is at least one selected from the group consisting of aluminum, silicon and titanium.

4. The catalyst powder according to claim 1, wherein the composite compound is a spinel compound.

5. The catalyst powder according to claim 4, wherein the spinel compound is $CoAl_2O_4$.

6. The catalyst powder according to claim 1, further comprising:
   a compound formed of at least one element selected from the group consisting of cerium, neodymium, praseodymium, lanthanum, zirconium, barium and magnesium.

7. The catalyst powder according to claim 1,
   wherein an amount of noble metal is 0.7 g or less per 1 L of a volume of an exhaust gas purifying catalyst.

8. The catalyst powder according to claim 1, wherein the noble metal particle is buried within the composite compound.

9. The catalyst powder according to claim 8, wherein the composite compound includes pores that permit gas to enter the catalyst powder, wherein the pores of the composite compound permit the gas to reach the noble metal particle buried within the composite compound.

* * * * *